United States Patent
Reunanen

(10) Patent No.: US 10,043,259 B2
(45) Date of Patent: Aug. 7, 2018

(54) FACILITATING ANOMALY DETECTION FOR A PRODUCT HAVING A PATTERN

(71) Applicant: PT Papertech Inc., North Vancouver (CA)

(72) Inventor: Juha Reunanen, Helsinki (FI)

(73) Assignee: PT PAPERTECH INC. (CA)

( * ) Notice: Subject to any disclaimer, the term of this patent is extended or adjusted under 35 U.S.C. 154(b) by 114 days.

(21) Appl. No.: 15/219,099

(22) Filed: Jul. 25, 2016

(65) Prior Publication Data
US 2018/0025485 A1    Jan. 25, 2018

(51) Int. Cl.
G06K 9/00    (2006.01)
G06T 7/00    (2017.01)

(52) U.S. Cl.
CPC .. *G06T 7/0004* (2013.01); *G06T 2207/10004* (2013.01); *G06T 2207/30161* (2013.01)

(58) Field of Classification Search
None
See application file for complete search history.

(56) References Cited

U.S. PATENT DOCUMENTS

| | | |
|---|---|---|
| 3,832,064 A | 8/1974 | Horst et al. |
| 4,330,775 A | 5/1982 | Iwamoto et al. |
| 4,349,880 A | 9/1982 | Southgate et al. |
| 4,360,269 A | 11/1982 | Iwamoto et al. |
| 4,632,560 A | 12/1986 | Stringfield |
| 4,771,468 A | 9/1988 | Batchelder et al. |
| 4,845,558 A | 7/1989 | Tsai et al. |
| 4,969,198 A | 11/1990 | Batchelder et al. |
| 5,513,275 A | 4/1996 | Khalaj et al. |
| 5,528,526 A | 6/1996 | Klug et al. |

(Continued)

FOREIGN PATENT DOCUMENTS

| | | |
|---|---|---|
| EP | 1779323 | 5/2007 |
| WO | 2006012914 A1 | 2/2006 |

OTHER PUBLICATIONS

Farooq, Umer et al., "Machine vision using image data feedback for fault detection in complex deformable webs", Transactions of the Institute of Measurement and Control 26, 2 (2004) pp. 119-137.

(Continued)

*Primary Examiner* — Stephen Coleman
(74) *Attorney, Agent, or Firm* — Kolisch Hartwell, P.C.

(57) ABSTRACT

A method for facilitating detection of at least one anomaly in a representation of a product having a pattern is provided. The method involves causing at least one processor to receive image data representing the product during processing, identify from the image data generally similar images representing respective instances of a repeated aspect of the pattern, each of the images including image element values, generate a set of corresponding image element values including an image element value from each image, identify at least one image element value from the set of corresponding image element values to be excluded from a subset of the set of corresponding image element values, generate at least one criterion based on the subset, and cause the at least one criterion to be used to facilitate identification of the at least one anomaly. Other methods, apparatuses, systems, and computer readable media are also provided.

34 Claims, 15 Drawing Sheets

(56) References Cited

U.S. PATENT DOCUMENTS

| | | |
|---|---|---|
| 5,999,636 A | 12/1999 | Juang |
| 6,266,437 B1 | 7/2001 | Eichel et al. |
| 6,295,374 B1 | 9/2001 | Robinson et al. |
| 6,324,298 B1* | 11/2001 | O'Dell ................ G01N 21/9501 257/E21.53 |
| 6,751,343 B1 | 6/2004 | Ferrell et al. |
| 6,950,547 B2 | 9/2005 | Floeder et al. |
| 7,027,934 B2 | 4/2006 | Skeps et al. |
| 7,041,998 B2 | 5/2006 | Weiss et al. |
| 7,436,993 B2 | 10/2008 | Onishi et al. |
| 7,463,770 B2 | 12/2008 | Paquette et al. |
| 7,583,840 B2 | 9/2009 | Paquette et al. |
| 7,584,699 B2 | 9/2009 | Ford |
| 8,023,720 B2 | 9/2011 | Reunanen et al. |
| 2009/0208089 A1 | 8/2009 | Probst et al. |
| 2013/0101221 A1* | 4/2013 | Fujiki ................ G06K 9/6284 382/195 |
| 2015/0023647 A1* | 1/2015 | Nojima ................ H04N 7/185 386/201 |

OTHER PUBLICATIONS

Ngan, Henry Y. T. et al., "Regularity Analysis for Patterned Texture Inspection", IEEE Transactions on Automation science and Engineering, vol. 6, No. 1, Jan. 2009, pp. 131-144.

Ngan, Henry Y. T. et al., "Automated fabric defect detection—A review", Science Direct, Image and Vision Computing 29 (2011), pp. 442-458.

Sanby, C. et al., "The Automated Inspection of Lace Using Machine Vision", Mechatronics vol. 5, No. 2/3, Mar.-Apr. 1995, pp. 215-231.

Schneider, Heinz et al., "Online inspection paves the way for quality production", C2 Europe, Coating & Converting, Jul./Aug. 2009, pp. 31-32.

* cited by examiner

300

Pattern Identifier Record

302 ~ Pattern Start  0
304 ~ Pattern Length  1326

Corresponding image elements record

402 — Pixel position (0,0)
406 — Pixel value 95
407 — Pixel value 94
410 — Pixel value 112
        Pixel value 90
408 — Pixel value 60
        Pixel value 91
        Pixel value 93
404   Pixel value 90
        Pixel value 92
        Pixel value 95
        Pixel value 91
        Pixel value 94
        Pixel value 91
        Pixel value 92
        Pixel value 92

| Identify at least one lowest pixel value | — 502 |
| Identify at least one greatest pixel value | — 504 |
| Generate updated corresponding image elements record | — 506 |

FIG. 9

550 Updated Corresponding image elements record

Pixel position (0,0)

552
- Pixel value 95
- Pixel value 94
- Pixel value 90
- Pixel value 91
- Pixel value 93
- Pixel value 90
- Pixel value 92
- Pixel value 95
- Pixel value 91
- Pixel value 94
- Pixel value 91
- Pixel value 92
- Pixel value 92

| Identify lowest pixel intensity value | ~602 |
| Identify greatest pixel intensity value | ~604 |
| Generate a criterion having upper and lower limits set to the identified greatest and lowest pixel intensity values | ~606 |

Criterion Record

652 ~ Pixel position (0,0)
654 ~ Lower limit 90
656 ~ Upper limit 95

Criterion record

882 ~ Pixel Position (0,1298)
884 ~ Lower limit 88
886 ~ Upper limit 93

New image element record

902 ~ Pixel Position (0,0)
904 ~ Pixel Value 128

Criterion record

Pixel Position (240,52)
952 ~ Lower limit 120
954 ~ Upper limit 150

New image element record

Pixel Position (240,80)
1002 ~ Pixel Value 59

FIG. 20

FACILITATING ANOMALY DETECTION FOR A PRODUCT HAVING A PATTERN

BACKGROUND

1. Field

This disclosure relates to facilitating anomaly detection and more particularly to facilitating anomaly detection for a product having a pattern.

2. Description of Related Art

Products having patterns are produced in various fields including for example, paper, laminate, textiles, wood, etc. As for any product, quality control for patterned products is important. Quality control may be facilitated by computer implemented systems which are configured to detect anomalies or defects in the patterned product. For example, some computer systems may be configured to compare an image of the product with a template image, which is believed to be representative of a defect free product and to detect the anomalies by determining differences between the image of the product and the template image. However, these computer systems may not be able to accurately detect anomalies since what is representative of a defect free product may change during processing, for example, due to changes in the processing equipment. Some computer systems may be configured to compare instances of repeated elements of the actual product as it is processed, but these computer systems may also fail to provide reliable anomaly detection for various reasons, including, for example, because the repeated elements which are used for comparison may themselves have defects.

In view of the foregoing, there remains a need for an improved computer-implemented method, apparatus and/or system for facilitating anomaly detection for a product having a pattern.

SUMMARY

One illustrative embodiment describes a method for facilitating detection of at least one anomaly in a representation of a product having a pattern. The method involves causing at least one processor to receive image data representing the product during processing of the product, causing the at least one processor to identify from the image data generally similar images representing respective instances of a repeated aspect of the pattern, each of the images including image element values, and causing the at least one processor to generate a set of corresponding image element values, the set including an image element value from each of the images. The method also involves causing the at least one processor to identify at least one image element value from the set of corresponding image element values to be excluded from a subset of the set of corresponding image element values, causing the at least one processor to generate at least one criterion based on the subset of the set of corresponding image element values, and causing the at least one processor to cause the at least one criterion to be used to facilitate identification of the at least one anomaly.

Causing the at least one processor to cause the at least one criterion to be used to facilitate identification of the at least one anomaly may involve causing the at least one processor to receive image data representing a subject image representing at least a portion of an instance of the repeated aspect of the pattern, and causing the at least one processor to apply the at least one criterion to a subject image element value of the subject image, the subject image element value corresponding to the subset of corresponding image element values.

Causing the at least one processor to generate the at least one criterion may involve causing the at least one processor to determine an upper limit value from the subset of the set of corresponding image element values and causing the at least one processor to apply the at least one criterion may involve causing the at least one processor to compare the subject image element value to the upper limit value.

Causing the at least one processor to generate the at least one criterion may involve causing the at least one processor to determine a lower limit value from the subset of the set of corresponding image element values and causing the at least one processor to apply the at least one criterion may involve causing the at least one processor to compare the subject image element value to the lower limit value.

Causing the at least one processor to generate the at least one criterion may involve causing the at least one processor to determine an upper limit value and a lower limit value from the subset of the set of corresponding image element values and causing the at least one processor to apply the at least one criterion may involve causing the at least one processor to compare the subject image element value to the upper limit value and the lower limit value.

Causing the at least one processor to determine the upper limit value and the lower limit value may involve causing the at least one processor to set the upper limit value and the lower limit value to a greatest value and a lowest value respectively of the subset of the set of corresponding image element values.

Causing the at least one processor to determine the upper limit value and the lower limit value may involve causing the at least one processor to determine a standard deviation and a mean from the subset of the set of corresponding image element values and to derive the upper limit value and the lower limit value from the standard deviation and the mean.

Causing the at least one processor to cause the at least one criterion to be used to facilitate identification of the at least one anomaly may involve causing the at least one processor to determine whether the subject image element value is greater than the upper limit or less than the lower limit, and causing the at least one processor to, if the subject image element value is greater than the upper limit or less than the lower limit: generate a new image element value derived from the subject image element value and at least one of the upper limit and the lower limit, and generate a new image including the new image element value for inspection.

Causing the at least one processor to cause the at least one criterion to be used to facilitate identification of the at least one anomaly may involve causing the at least one processor to, if the subject image element value is not greater than the upper limit or less than the lower limit, generate the new image to include a neutral image element value.

The method may further involve causing the at least one processor to transmit signals representing the new image to an anomaly detector.

The method may further involve causing the at least one processor to inspect the new image to determine whether the new image element value is anomalous.

The method may further involve causing the at least one processor to produce signals for causing at least one display to display a representation of the at least one anomaly to a user.

Causing the at least one processor to identify the at least one image element value to be excluded from the subset may involve causing the at least one processor to identify at least one extreme image element value as the at least one image element value to be excluded.

The set of corresponding image element values may involve pixel values and causing the at least one processor to identify the at least one extreme image element value to be excluded may involve causing the at least one processor to identify at least one lowest pixel value of the pixel values to be excluded and at least one greatest pixel value of the pixel values to be excluded.

Causing the at least one processor to identify the at least one lowest pixel value and the at least one greatest pixel value may involve causing the at least one processor to identify a first percentage of the pixel values having lowest values as the at least one lowest pixel value and to identify a second percentage of the pixel values having greatest values as the at least one greatest pixel value.

The first and second percentages may be each between about 5% and about 15%.

Another illustrative embodiment describes a computer readable medium having stored thereon codes which, when executed by at least one processor, cause the at least one processor to perform any of the above methods.

Another illustrative embodiment describes a system for facilitating detection of at least one anomaly in a representation of a product having a pattern. The system includes provisions for receiving image data representing the product during processing of the product, provisions for identifying from the image data generally similar images representing respective instances of a repeated aspect of the pattern, each of the images including image element values, and provisions for generating a set of corresponding image element values, the set including an image element value from each of the images. The system also includes provisions for identifying at least one image element value from the set of corresponding image element values to be excluded from a subset of the set of corresponding image element values, provisions for generating at least one criterion based on the subset of the set of corresponding image element values, and provisions for causing the at least one criterion to be used to facilitate identification of the at least one anomaly.

The provisions for causing the at least one criterion to be used to facilitate identification of the at least one anomaly may include provisions for receiving image data representing a subject image representing at least a portion of an instance of the repeated aspect of the pattern, and provisions for applying the at least one criterion to a subject image element value of the subject image, the subject image element value corresponding to the subset of corresponding image element values.

The provisions for generating the at least one criterion may include provisions for determining an upper limit value from the subset of the set of corresponding image element values and the provisions for applying the at least one criterion may include provisions for comparing the subject image element value to the upper limit value.

The provisions for generating the at least one criterion may include provisions for determining a lower limit value from the subset of the set of corresponding image element values and the provisions for applying the at least one criterion may include provisions for comparing the subject image element value to the lower limit value.

The provisions for generating the at least one criterion may include provisions for determining an upper limit value and a lower limit value from the subset of the set of corresponding image element values and the provisions for applying the at least one criterion may include provisions for comparing the subject image element value to the upper limit value and the lower limit value.

The provisions for determining the upper limit value and the lower limit value may include provisions for setting the upper limit value and the lower limit value to a greatest value and a lowest value respectively of the subset of the set of corresponding image element values.

The provisions for determining the upper limit value and the lower limit value may include provisions for determining a standard deviation and a mean from the subset of the set of corresponding image element values and provisions for deriving the upper limit value and the lower limit value from the standard deviation and the mean.

The provisions for causing the at least one criterion to be used to facilitate identification of the at least one anomaly may include provisions for determining whether the subject image element value is greater than the upper limit or less than the lower limit, and provisions for, if the subject image element value is greater than the upper limit or less than the lower limit: generating a new image element value derived from the subject image element value and at least one of the upper limit and the lower limit, and generating a new image including the new image element value for inspection.

The provisions for causing the at least one criterion to be used to facilitate identification of the at least one anomaly may include provisions for, if the subject image element value is not greater than the upper limit or less than the lower limit, generating the new image to include a neutral image element value.

The system may further include provisions for transmitting the signals representing the new image to an anomaly detector.

The system may further include provisions for inspecting the new image to determine whether the new image element value is anomalous.

The system may further include provisions for displaying a representation of the at least one anomaly to a user.

The provisions for identifying the at least one image element value to be excluded from the subset may include provisions for identifying at least one extreme image element value as the at least one image element value to be excluded.

The set of corresponding image element values may include pixel values and the provisions for identifying the at least one extreme image element value to be excluded may include provisions for identifying at least one lowest pixel value of the pixel values to be excluded and at least one greatest pixel value of the pixel values to be excluded.

The provisions for identifying the at least one lowest pixel value and the at least one greatest pixel value may include provisions for identifying a first percentage of the pixel values having lowest values as the at least one lowest pixel value and provisions for identifying a second percentage of the pixel values having greatest values as the at least one greatest pixel value.

The first and second percentages may be each between about 5% and about 15%.

Another illustrative embodiment describes an apparatus for facilitating detection of at least one anomaly in a representation of a product having a pattern. The apparatus includes at least one processor configured to receive image data representing the product during processing of the product, identify from the image data generally similar images representing respective instances of a repeated aspect of the pattern, each of the images including image element values, and generate a set of corresponding image element values, the set including an image element value from each of the images. The at least one processor is also configured to identify at least one image element value from the set of corresponding image element values to be excluded from a subset of the set of corresponding image element values, generate at least one criterion based on the subset of the set of corresponding image element values, and cause the at least one criterion to be used to facilitate identification of the at least one anomaly.

The at least one processor may be configured to receive image data representing a subject image representing at least a portion of an instance of the repeated aspect of the pattern, and apply the at least one criterion to a subject image element value of the subject image, the subject image element value corresponding to the subset of corresponding image element values.

The at least one processor may be configured to determine an upper limit value from the subset of the set of corresponding image element values, and compare the subject image element value to the upper limit value.

The at least one processor may be configured to determine a lower limit value from the subset of the set of corresponding image element values, and compare the subject image element value to the lower limit value.

The at least one processor may be configured to determine an upper limit value and a lower limit value from the subset of the set of corresponding image element values, and compare the subject image element value to the upper limit value and the lower limit value.

The at least one processor may be configured to set the upper limit value and the lower limit value to a greatest value and a lowest value respectively of the subset of the set of corresponding image element values.

The at least one processor may be configured to determine a standard deviation and a mean from the subset of the set of corresponding image element values and to derive the upper limit value and the lower limit value from the standard deviation and the mean.

The at least one processor may be configured to determine whether the subject image element value is greater than the upper limit or less than the lower limit, and if the subject image element value is greater than the upper limit or less than the lower limit: generate a new image element value derived from the subject image element value and at least one of the upper limit and the lower limit, and generate a new image including the new image element value for inspection.

The at least one processor may be configured to, if the subject image element value is not greater than the upper limit or less than the lower limit, generate the new image to include a neutral image element value.

The at least one processor may be configured to transmit signals representing the new image to an anomaly detector.

The at least one processor may be configured to inspect the new image to determine whether the new image element value is anomalous.

The apparatus may further include at least one display and the at least one processor may be configured to produce signals for causing the at least one display to display a representation of the at least one anomaly to a user.

The at least one processor may be configured to identify at least one extreme image element value as the at least one image element value to be excluded.

The set of corresponding image element values may include pixel values and the at least one processor may be configured to identify at least one lowest pixel value of the pixel values to be excluded and at least one greatest pixel value of the pixel values to be excluded.

The at least one processor may be configured to identify a first percentage of the pixel values having lowest values as the at least one lowest pixel value and to identify a second percentage of the pixel values having greatest values as the at least one greatest pixel value.

The first and second percentages may be each between about 5% and about 15%.

Other aspects and features of the present invention will become apparent to those ordinarily skilled in the art upon review of the following description of specific embodiments of the invention in conjunction with the accompanying figures.

BRIEF DESCRIPTION OF THE DRAWINGS

In drawings which illustrate embodiments of the invention,

FIG. 6 is a representation of an exemplary pattern identifier record used by the processor circuit of FIG. 2 according to one embodiment;

FIG. 8 is a representation of an exemplary corresponding image elements record used by the processor circuit of FIG. 2 according to one embodiment;

FIG. 9 is a flowchart depicting blocks of code included in the blocks of code shown in FIG. 3, according to one embodiment;

FIG. 10 is a representation of an exemplary updated corresponding image elements record used by the processor circuit of FIG. 2 according to one embodiment;

FIG. 11 is a flowchart depicting blocks of code included in the blocks of code shown in FIG. 3, according to one embodiment;

FIG. 12 is a representation of an exemplary criterion record used by the processor circuit of FIG. 2 according to one embodiment;

FIG. 17 is a representation of an exemplary criterion record used by the processor circuit of FIG. 2 according to one embodiment;

FIG. 18 is a representation of an exemplary new image element record used by the processor circuit of FIG. 2 according to one embodiment;

FIG. 19 is a representation of an exemplary criterion record used by the processor circuit of FIG. 2 according to one embodiment;

FIG. 20 is a representation of an exemplary new image element record used by the processor circuit of FIG. 2 according to one embodiment;

DETAILED DESCRIPTION

Figure 1:
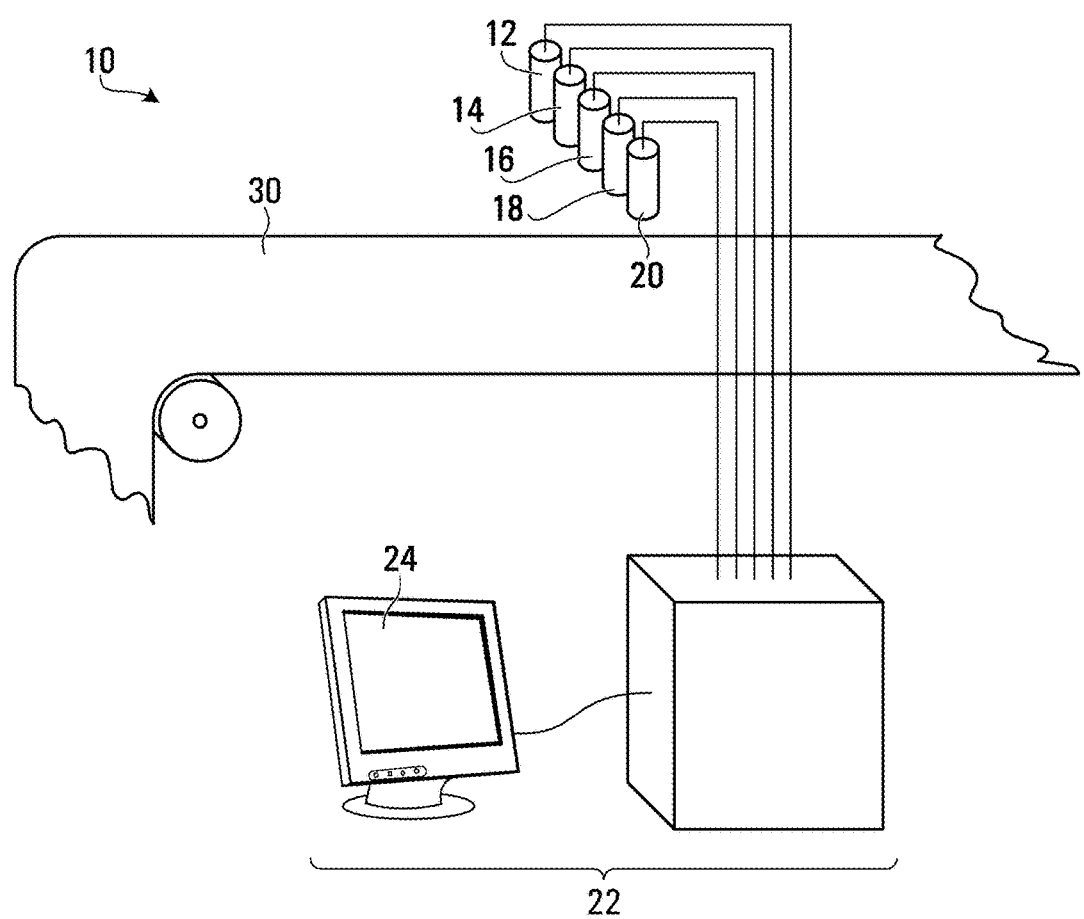
FIG. 1 is a schematic view of a system for facilitating identification of at least one anomaly in a product having a pattern according to one embodiment.

Referring to FIG. 1, a system for facilitating identification of at least one anomaly in a representation of a product or web 30 having a pattern, in accordance with one embodiment is shown at 10. For example, the product or web 30 may be a medium being manufactured in a continuous process. In one embodiment, the product 30 may be, for example, a paper product that is being processed and has a repeating pattern thereon. In various embodiments, the product 30 may be another product which has a repeating element or pattern that is detectable thereon, including by way of example, a paper product, a laminate product for flooring or a tabletop, for example, a wood product, and/or a textile. Referring to FIG. 1, the system 10 shown includes first, second, third, fourth and fifth cameras 12, 14, 16, 18, and 20 for collecting images of the product 30 and an inspecting device or inspector 22 for receiving the images of the product and facilitating detection of an anomaly in the product 30. The inspector 22 may, for example, include a computer or a processor circuit.

In operation, the product 30 is moved past the cameras 12-20 and the cameras 12-20 capture image data representing images of the product 30. In some embodiments, the cameras 12-20 may be line scan type cameras, such as, DALSA™ Linea 2k cameras, for example. In some embodiments, the cameras 12-20 may be area or matrix type cameras. While the cameras 12-20 shown in FIG. 1 are located above the product 30, in some embodiments, alternative or additional cameras may be located below the product. The cameras 12-20 transmit signals representing the image data to the inspector 22 and the inspector 22 generates at least one criterion or a test which can be applied to future received images of the product 30 to help to determine whether the future received images or subject images and therefore the product 30 has any anomalies. For example, in one embodiment, the inspector 22 may apply the at least one criterion to a future received image to generate a new image which emphasizes areas of the received image that may include anomalies. The new image may then be inspected by the inspector 22 or another device to identify or facilitate identification of anomalies. The anomalies may represent a defect in the product 30, for example, and may include, for example, dirt on the product 30, a printing error, an embossing error, holes in the product, wrinkles in the product, streaks or lack of coating in the product, mechanical defects and/or any combination thereof.

For example, mechanical defects may be caused by some part of the machine producing or processing the product 30. For example, in the case of converting lines, the shipping and handling from original production to converting may cause defects or anomalies. In some embodiments, anomalies may include defects caused by unevenly distributed or clumped substances (e.g. chemicals added to the product on purpose). In various embodiments, anomalies may have nothing to do with the pattern. However, the presence of the pattern may make it difficult to detect such anomalies, without the inspector 22 as described herein.

In some embodiments, for an embossed product, an anomaly may be an embossed texture that is not defined enough (too weak) or uneven embossing. In some embodiments, where the product 30 is toilet paper with an embossed image in the center of a sheet, anomalies may arise when the embossing is not centered within the length of an individual sheet, defined by the perforated cut lines.

In some embodiments, for a product manufactured using a printing process (or any process which alters and/or adds color or pigment different from the base medium such as printing or embossing, for example), anomalies may include the loss of registration between two printed components so they are no longer in place relative to each other. A blue flower on a green stem may become separated, for example.

The inspector 22 may produce signals representing the anomalies for causing a display 24 of the inspector 22 to present a representation of the anomalies to a user.

The inspector 22 may derive the at least one criterion from the received image data, using the fact that the product 30 includes a pattern and therefore has repeating elements to generate the at least one criterion. For example, the inspector 22 may identify instances of a generally repeated image or aspect of the pattern from within the image data and identify sets of corresponding image elements from each of the instances of the repeated image which are expected to be generally similar. The inspector 22 may derive an upper limit and/or a lower limit for each of the sets of corresponding image elements within the repeated images and use these limits as criteria to be applied to corresponding image elements of future received images.

However, since the image data received by the inspector may include anomalies of its own, the inspector 22 may be configured to not use all of the corresponding image element values to derive the at least one criterion. In various embodiments, in order to discard possible anomalies from the received image data and therefore have a potentially more accurate test or criteria, the inspector 22 may identify at least one image element from each set of corresponding image elements for exclusion from a subset of corresponding image elements, and the inspector may generate the at least one criterion from the subset of image elements.

In various embodiments, by excluding image elements from a subset of corresponding image elements and using the subset to generate the at least one criterion, the inspector 22 may facilitate generation of at least one criterion which may be more accurate in identifying anomalies in the product 30.

Processor Circuit—Inspector

Figure 2:
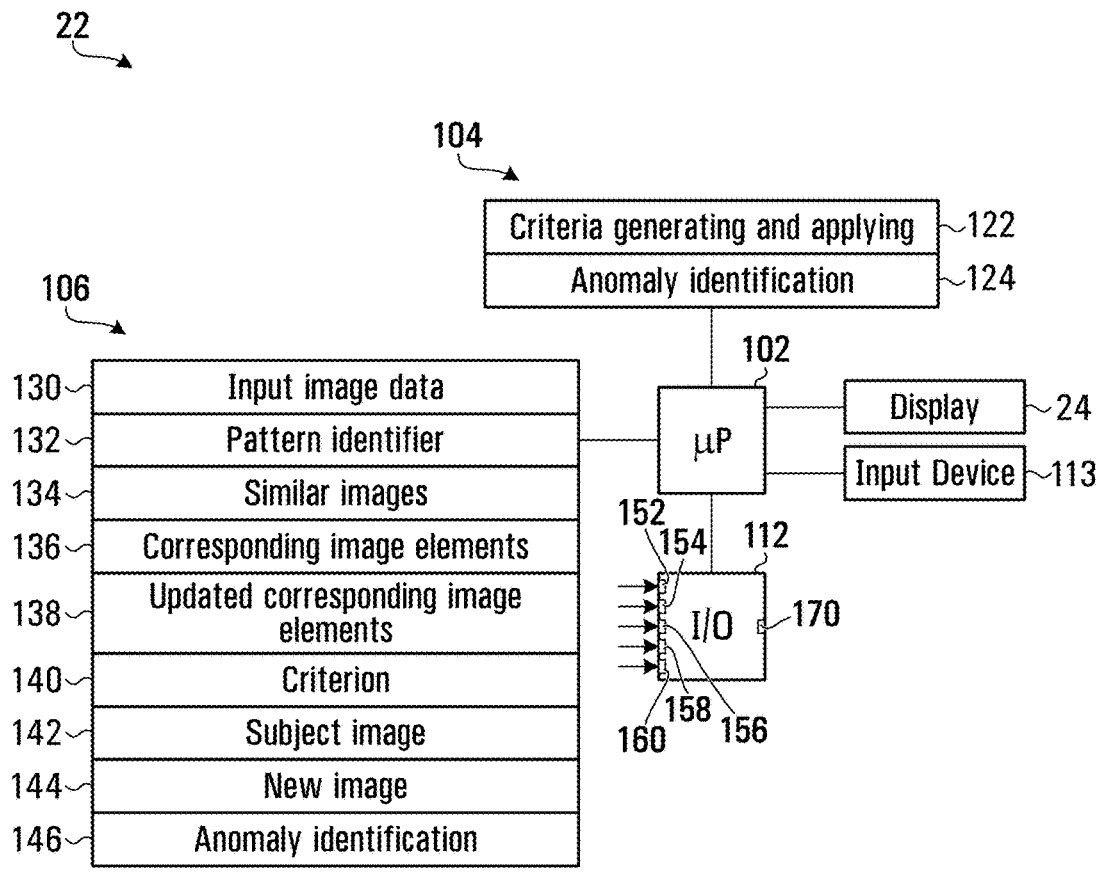
FIG. 2 is a schematic view of a processor circuit for implementing an inspector included in the system of FIG. 1, in accordance with one embodiment.

Referring to FIG. 2, a processor circuit for implementing the inspector 22 shown in FIG. 1 according to one embodiment is shown. Referring to FIG. 2, the inspector 22 includes a processor 102 and a program memory 104, a storage memory 106, an input output ("I/O") interface 112, one or more user input devices 113 which may include a pointing device such as a mouse and/or a keyboard, for example, and the display 24 all of which are in communication with the processor 102. In general, the storage memory 106 stores data to facilitate various functions of the inspector, and the program memory 104 stores program codes for directing the processor 102 to carry out various functions that are stored in the program memory 104.

The storage memory 106 and/or the program memory 104 may be implemented on one or more computer-readable and/or computer-writable memory such as one or more of a random-access memory ("RAM") or a hard disk drive ("HDD"), or a combination of one or more RAM and of one or more HDD. For example, the storage memory 106 and/or the program memory 104 may be implemented in RAM, a hard drive, solid state memory, a network drive, flash memory, a memory stick or card, removable memory, any other form of computer-readable memory or storage medium and/or any combination thereof. In some embodiments, the program memory 104, the storage memory 106, and/or any portion thereof may be included in a device separate from the inspector 22 and in communication with the inspector 22 via the I/O interface 112, for example.

In the embodiment shown, the program memory 104 includes a block of codes 122 for directing the processor 102 to perform criteria generating and applying functions and a block of codes 124 for directing the processor 102 to perform anomaly identification functions.

In some embodiments, the storage memory 106 includes a plurality of storage locations including locations 130 for storing input image data, locations 132 for storing pattern identifier information, locations 134 for storing generally similar image information, locations 136 for corresponding image elements data, locations 138 for storing updated corresponding image elements data, locations 140 for storing criterion data, locations 142 for storing subject image data, locations 144 for storing new image data, and locations 146 for storing anomaly identification data. In various embodiments, the plurality of storage locations may be stored in a database in the storage memory 106. In various embodiments the storage memory 106 may also include various other storage locations for storing additional data for facilitating functionality of the inspector 22 as described herein.

The I/O interface 112 includes input ports 152, 154, 156, 158, and 160 for receiving signals from the first, second, third, fourth and fifth cameras 12, 14, 16, 18, and 20 respectively. In various embodiments, the input ports 152, 154, 156, 158, and 160 of the I/O interface 112 may be Ethernet ports, for example, and the cameras 12, 14, 16, 18, 20 may be IP cameras. In some embodiments, a single physical input port may act as the input ports 152-160.

In various embodiments, the inspector 22 or portions of the inspector 22 shown in FIGS. 1 and 2 may be implemented using one or more processor circuits each including one or more processors. For example, in an embodiment, the inspector 22 or elements thereof may be included in a smart camera which may be incorporated in any or all of the cameras 12-20 shown in FIG. 1. In some embodiments, elements of the inspector 22 which are configured to perform anomaly identification functions may be included in a separate device having its own processor, independent of other elements of the inspector 22. In such embodiments, the I/O interface 112 may include an interface 170 for communicating with the anomaly detection device. The interface 170 may facilitate networked communication and may include a network interface card with an input/output for connecting to a network, through which communications may be conducted with devices connected to the network, such as the anomaly detection device.

Figure 3:
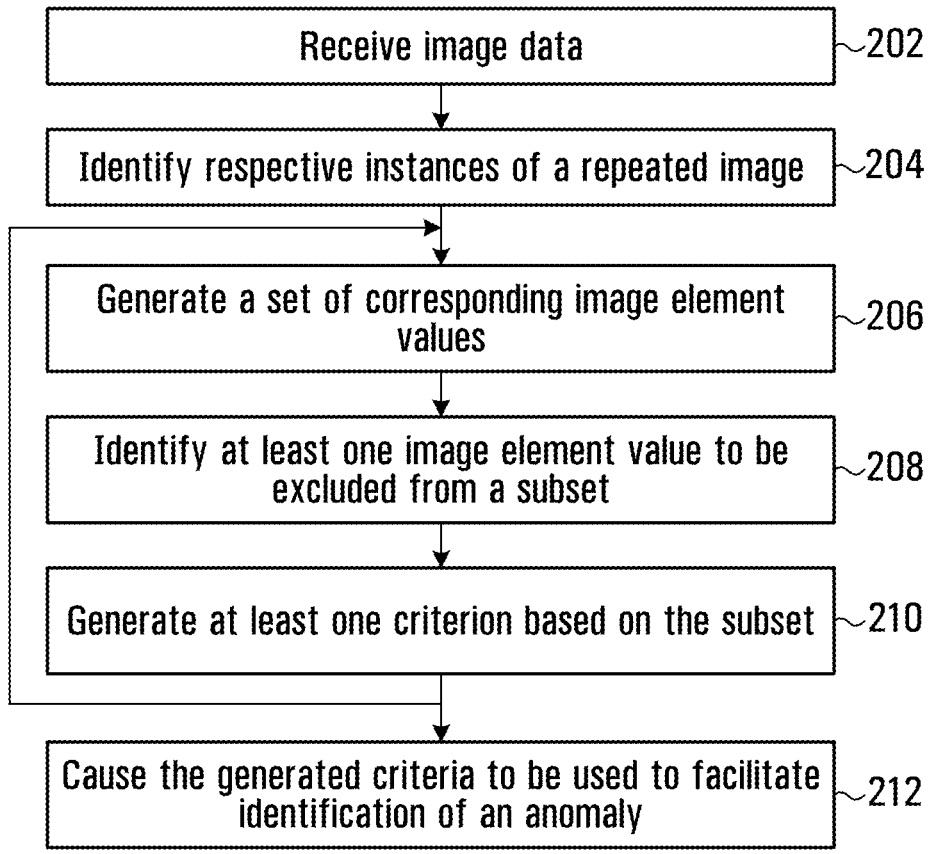
FIG. 3 is a flowchart depicting blocks of code for directing the inspector shown in FIG. 2 to facilitate identification of at least one anomaly according to one embodiment.

Generating at Least One Criterion and Causing the at Least One Criterion to be Applied Referring to FIG. 3, codes which may be included in the criterion generating and applying codes 122 of the processor circuit shown in FIG. 2 in accordance with one embodiment are shown in greater detail. The codes 122 may be executed by the processor 102 to cause the processor 102 to facilitate detection of at least one anomaly in a representation of a product having a pattern. For example, a user may cause the codes 122 to be executed while the product 30 is being processed, to facilitate inspection of the product 30 and detection of an anomaly. In some embodiments, for example, the user may use the user input devices 113 to produce signals for causing the codes 122 to be executed by the processor 102.

Figure 4:
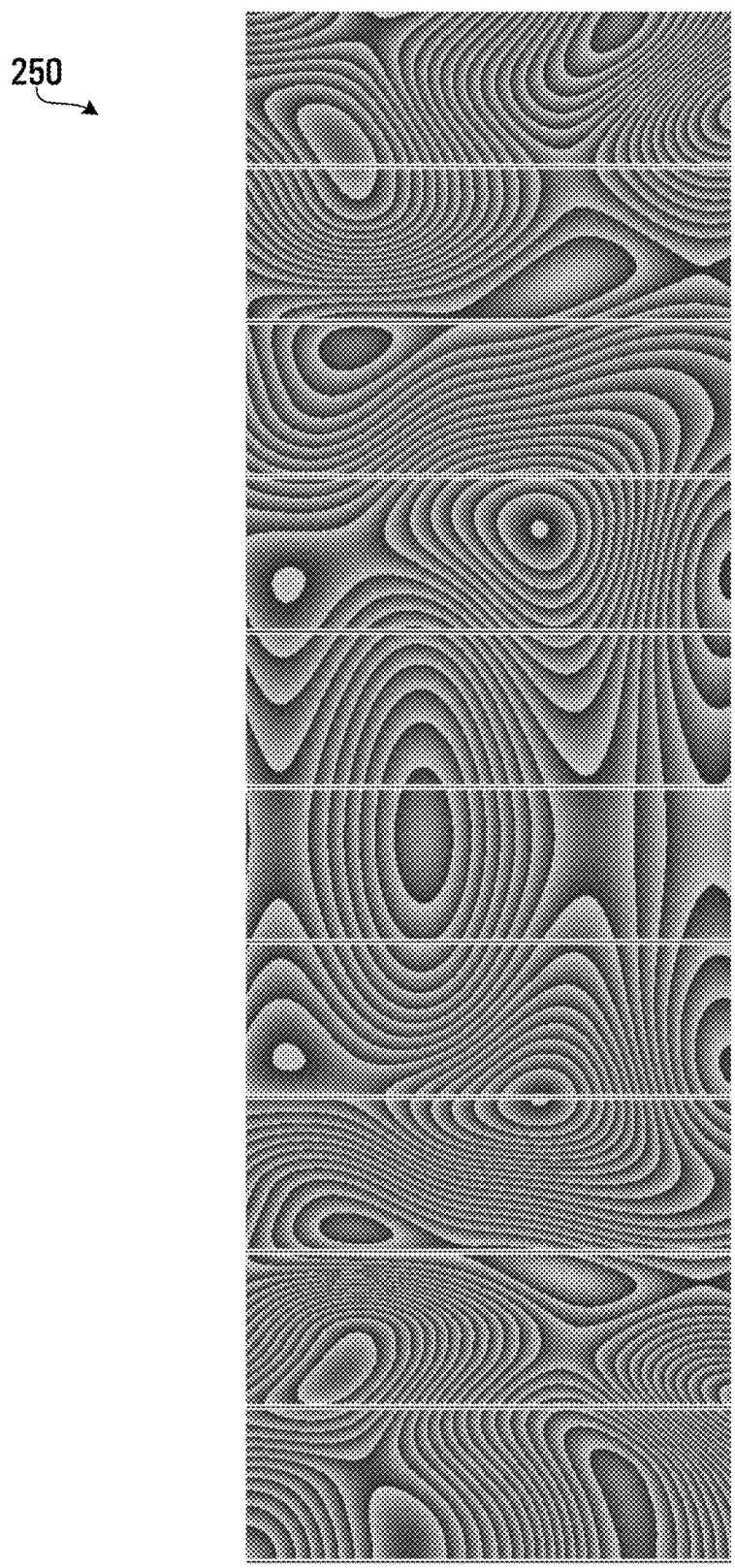
FIG. 4 is an exemplary representation of a plurality of images that may be received from a first camera included in the system of FIG. 1, according to one embodiment.

Referring to FIG. 3, the criterion generating codes 122 include a first block 202 which directs the processor 102 shown in FIG. 2 to receive image data representing the product 30. Block 202 may direct the processor 102 to receive image data via one or more of the input ports 152-160 of the I/O interface 112 shown in FIG. 2 from one or more of the cameras 12-20 shown in FIG. 1. In one embodiment, block 202 may direct the processor 102 to receive a first set of images from the first camera 12. The first set of images may include for example, separate images 250 as shown in FIG. 4 and the images may be taken by the first camera 12 at sequential time periods, such that the first set of images represent a length of the product 30 shown in FIG. 1. For example, in some embodiments, the first set of images may represent about 60 meters of the product 30 shown in FIG. 1.

Figure 5:
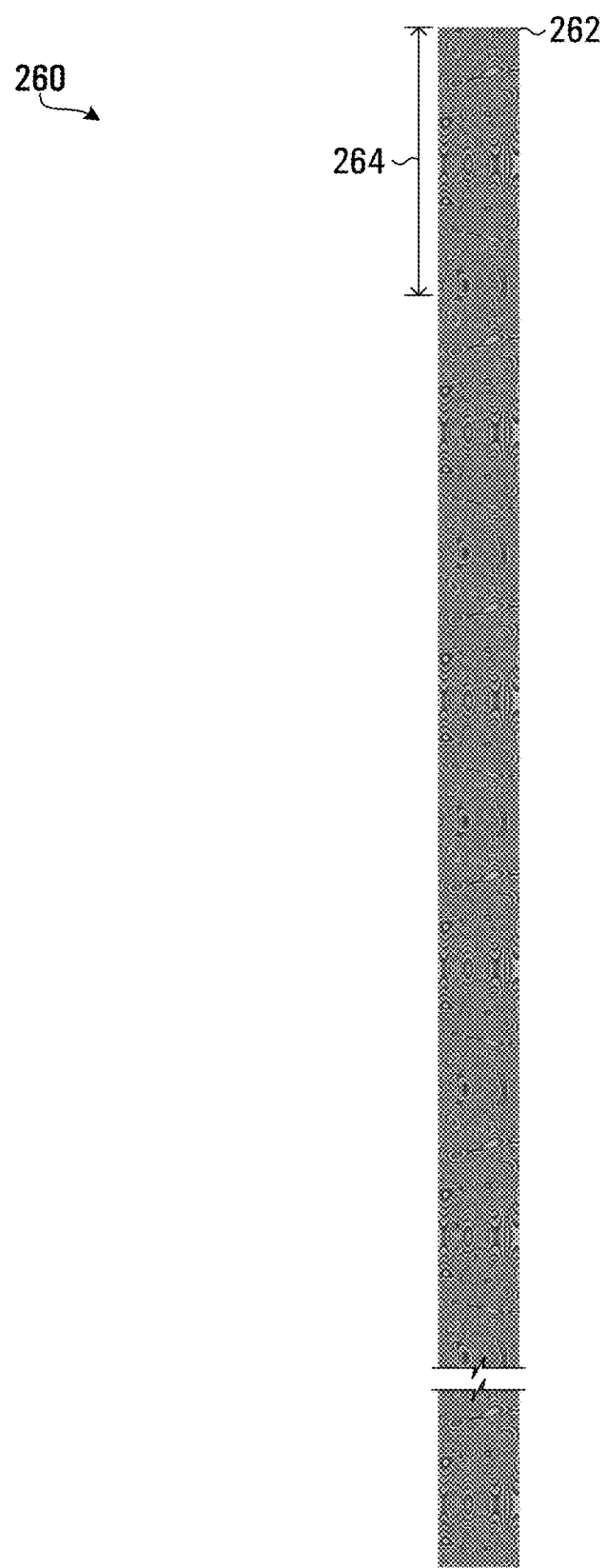
FIG. 5 is an exemplary representation of an accumulated image, used by the processor circuit of FIG. 2 according to one embodiment.

In various embodiments, block 202 may direct the processor 102 to combine the first set of images, including the images 250 shown in FIG. 4 to form an accumulated image as shown at 260 in FIG. 5. Block 202 may then direct the processor 102 shown in FIG. 2 to store a representation of the accumulated image 260 in the locations 130 of the storage memory 106.

In some embodiments, block 202 may direct the processor to receive image data including sets of images from each of the cameras 12-20 and to combine the sets of images to form an accumulated image generally similar to the one shown at 260 in FIG. 5 but with a larger width. In another embodiment, block 202 may receive image data representing an image generally similar to the full image shown at 260, for example, that does not need to be accumulated.

In various embodiments, the image data captured by one or more of the cameras 12-20 shown in FIG. 1 may be preprocessed before or when it is stored in storage locations 130 shown in FIG. 2, to be used by the processor 102. In some embodiments, this preprocessing may partly or entirely take place already inside each camera. In some embodiments, the preprocessing may be performed by the processor 102, and/or another processor that receives the image data before it is stored in storage location 130.

In various embodiments, the aim of the preprocessing may be to, for example, remove noise in the input data, and/or correct other non-idealities such as lens distortion and/or vignetting.

Referring to FIG. 3, block 204 then directs the processor 102 shown in FIG. 2 to identify from the image data generally similar images representing respective instances of a repeated element or image of the pattern. In one embodiment, block 204 directs the processor 102 to retrieve the representation of the accumulated image from the locations 130 in the storage memory 106 and to compare sections of the accumulated image 260 and use correlations between the sections to determine a pattern length and a pattern start position that works toward maximizing correlations between sections in the accumulated image 260 which begin at the pattern start position and are separated by the pattern length.

In some embodiments, block 204 may direct the processor 102 to calculate the differences between corresponding pixel intensity values of the different sections of the accumulated image 260 and use squared differences between corresponding pixel intensity values of the sections to determine a pattern length and a pattern start position that work towards minimizing the average of the squared differences between the corresponding pixel intensity values of the sections of the accumulated image 260. In some embodiments, block 204 may direct the processor 102 to find a pattern length and a pattern start position that work toward minimizing the average of absolute differences between the corresponding pixel intensity values of the sections, or minimizing or maximizing another criterion that measures the similarity, or the match, between two or more sections of the accumulated image 260.

In various embodiments, block 204 may direct the processor 102 to limit the search for a pattern length that works towards maximizing or minimizing a criterion, such as correlation or average of squared differences as described above, based on minimum and/or maximum plausible pattern lengths that are known beforehand. In some embodiments, block 204 may direct the processor 102 to prefer the identification of relatively shorter or longer patterns, or pattern lengths that are close to an expected pattern length. In some embodiments, a user may set the minimum, maximum, and/or expected pattern lengths. For example, the user may use the user input devices 113 shown in FIG. 2 to produce signals for setting the minimum, maximum, and/or expected pattern lengths.

For example, in the embodiment shown, block 204 may direct the processor 102 to determine a pattern start position to be at pixel row 0 which is shown at 262 in FIG. 5 and corresponds to a distance 0 meters from the beginning of the accumulated image 260. In some embodiments, row 0 may be used as a default pattern start position. In some embodiments, simply setting the pattern start position to row 0 may be a computationally less demanding mode of operation than determining a potentially different pattern start position.

In some embodiments, block 204 may direct the processor 102 to apply one or more criteria or tests to various candidate pattern start positions to determine the pattern start position. For example, block 204 may direct the processor 102 to choose the pattern start position such that a majority of deviation from mid-gray is in the middle of the eventual pattern. Thus, block 204 may direct the processor 102 to favor pattern start positions which include less deviation from mid-gray close to the candidate start or end of the pattern. For example, block 204 may assign a score to each candidate start position and may reduce the score for the candidate start position for each pixel, depending on how much the pixel deviates from mid-gray and how close the pixel is to the candidate start or end of the pattern. In various embodiments, if the product 30 includes a symbol or logo, this may facilitate the symbol or logo not being split up in the identified pattern.

In some embodiments, block 204 may direct the processor 102 to choose the pattern start position such that the eventual pattern is generally symmetric. For example, block 204 may direct the processor 102 to compare the top and bottom parts of a candidate pattern start and end position with a view to maximizing symmetry.

In some embodiments, If the pattern is not really continuous and there is a seam when going from one pattern instance to another, then block 204 may direct the processor 102 to determine the pattern start position as one which does not cause the seam to be generally near the middle of the generally similar images.

In some embodiments, the inspector 22 may have been previously provided with a reference pattern image (e.g., an upper limit image or lower limit image or average thereof determined from a previous use of the inspector 22), and block 204 may direct the processor 102 to compare candidate patterns or generally similar images identified based on candidate pattern start positions and choose a pattern start position that provides a candidate pattern that corresponds to the reference image. For example, block 204 may direct the processor 102 to choose a pattern start position that works towards maximizing a similarity between the candidate pattern and the reference image. In some embodiments, this may facilitate the pattern which is identified and processed as described below being relatively consistent and/or stable.

In some embodiments, one or more factors as described above may be weighted as part of a cost function to provide a score for each candidate start position. In some embodiments, a user may set a weight parameter for each factor. For example, the user may use the user input devices 113 shown in FIG. 2 to produce signals for setting the weight parameters. In some embodiments, determining the pattern start position as described above may facilitate cleaner looking upper and lower limit images being displayed to a user.

Referring to FIG. 3, block 204 may direct the processor 102 shown in FIG. 2 to retrieve the representation of the accumulated image from the locations 130 in the storage memory and to compare sections of the accumulated image 260 and use correlations between the sections to determine a pattern length that works toward maximizing correlations between sections in the accumulated image 260 which begin at the pattern start position and are separated by the pattern length. For example, block 204 may direct the processor 102 to determine a pattern length of 1326 pixel rows, which is shown generally at 264 in FIG. 5 and corresponds to a pattern length of about 3.83 meters on the product.

Referring to FIG. 3, in various embodiments, block 204 may direct the processor 102 shown in FIG. 2 to store a pattern identifier record 300 as shown in FIG. 6 in the locations 132 of the storage memory 106. The pattern identifier record 300 includes a pattern start field 302 for storing the determined pattern start position and a pattern length field 304 for storing the determined pattern length. In the embodiment shown, the pattern start field 302 stores a value representing a number of pixel rows at which the pattern starts within the accumulated image and the pattern length field 304 stores a value representing a length in pixels of the pattern identified, at which the pattern, which starts at the pattern start position repeats. In some embodiments, the pattern length field 304 value may be a decimal number as it may be determined using sub-pixel accuracy, when multiple pattern instances are available. In some embodiments, generally the pattern length may be measured as the total length of N pattern instances included in the accumulated image 260 divided by N.

In some embodiments, the best match from one pattern instance to another may be one or a few pixels off in one direction (both in x and y). In some embodiments, block 204 may direct the processor 102 to determine and store these individual offsets in the pattern identifier record 300. In some embodiments, the offsets may be used to assess a stability of the pattern producing process and/or a stability of the process that moves the product 30 from where the pattern is produced to where the product 30 is inspected.

Figure 7:
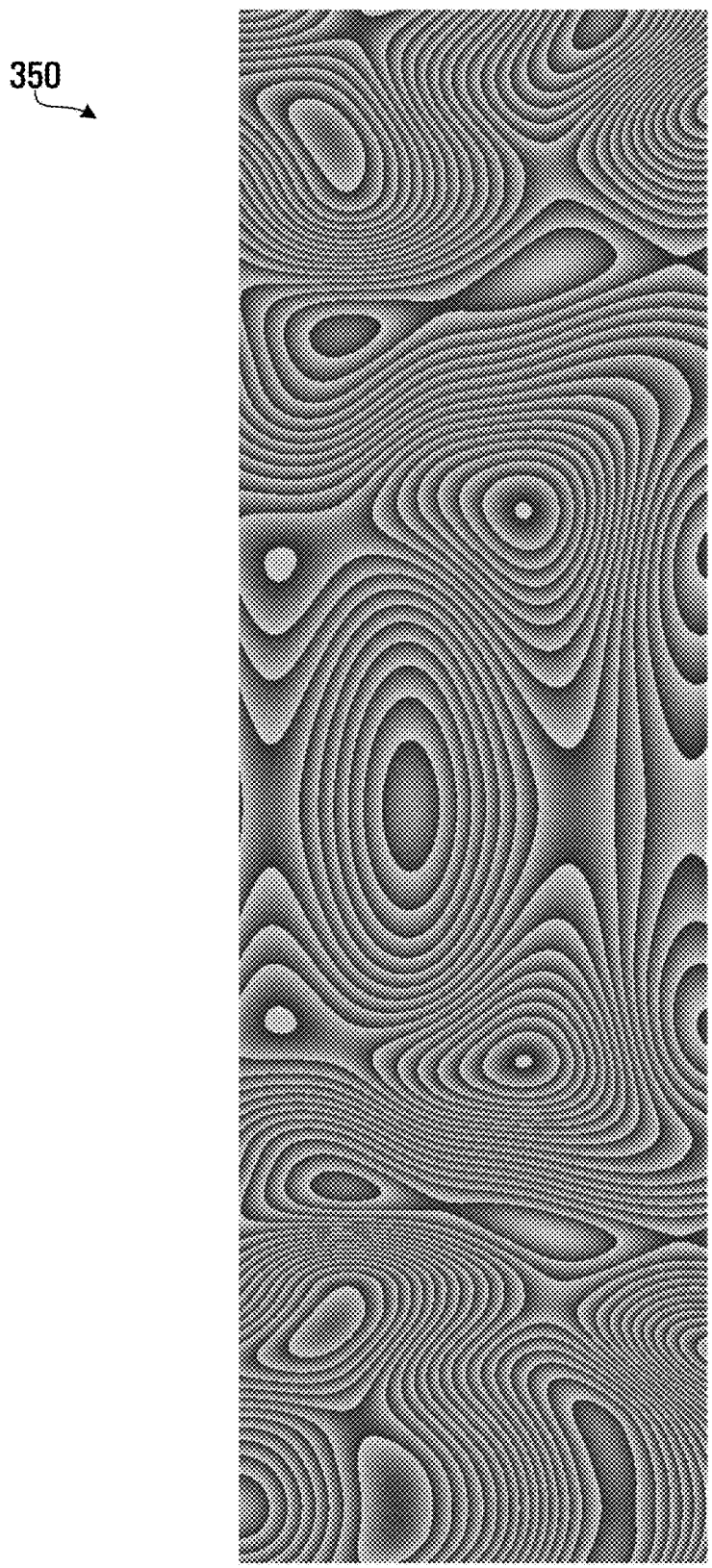
FIG. 7 is an exemplary representation of a first image that may be included in a set of generally similar images used by the processor circuit of FIG. 2 according to one embodiment.

Referring to FIG. 3, block 204 then directs the processor 102 shown in FIG. 2 to identify generally similar images included in the accumulated image 260 shown in FIG. 5 based on the values stored in the pattern start field 302 and the pattern length field 304 of the pattern identifier record 300 shown in FIG. 6. Referring to FIG. 7, a first image that may be included in a set of generally similar images identified within the accumulated image 260 is shown at 350. In one embodiment, the number of generally similar images identified may be 15. In one embodiment, block 204 may direct the processor 102 to generate and store representations of the generally similar images in the locations 134 of the storage memory 106.

In some embodiments, the number of generally similar images identified may be determined based on a consideration of a tradeoff between tolerating noise and having a sensitive and quickly reacting inspector. For example, in some embodiments where it may be known that there is a large amount of noise or defects, the number of generally similar images identified may be larger than 15, for example, about 50.

In some embodiments having a larger number of generally similar images identified may result in an inspector that does not react quickly to changes in the pattern. Accordingly, if the inspector is required to react quickly, then fewer generally similar images may be identified (e.g. about 5). In some embodiments, where fewer generally similar images are identified, the inspector may be configured to be relatively less sensitive in detecting anomalies in order to avoid false detections.

Once the generally similar images have been identified, the processor 102 may be directed to generate criteria which may be used to help identify anomalies in future received images. The processor may be directed to generate the criteria based on the properties of the generally similar images.

Referring to FIG. 3, block 206 directs the processor 102 shown in FIG. 2 to generate or identify a set of corresponding image element values from the set of generally similar images. In one embodiment, block 206 may direct the processor 102 to identify an image element value from each of the generally similar images, wherein the image element values are expected to correspond or to be generally similar, and to store a representation of the set of image element values in the storage memory 106.

For example, in one embodiment, the generally similar images are raster images having a plurality of pixel positions, with each pixel position associated with a pixel intensity value, and block 206 may direct the processor 102 to read pixel intensity values for a given pixel position (the same pixel position for each of the generally similar images, for example) in each of the generally similar images and to store the pixel intensity values as corresponding image element values in the storage memory 106. Since these pixel intensity values are taken from the same relative position in generally similar images, it may be expected that these pixel intensity values be similar. The pixel intensity values may thus act as corresponding image element values.

Referring to FIG. 3, block 206 may direct the processor 102 shown in FIG. 2 to store a representation of the pixel intensity values together in memory as a corresponding image elements record 400 shown in FIG. 8, in the locations 136 of the storage memory 106. In the embodiment shown, the corresponding image elements record 400 includes a pixel position field 402 for storing a pixel position and pixel intensity value fields 404 for storing pixel intensity values. The pixel position may act as an identifier for the corresponding image elements record 400 and each of the pixel intensity values may represent a pixel intensity associated with a pixel at the pixel position identified by the pixel position field 402 for one of the images in the set of generally similar images.

For example, a first pixel intensity value field 406 stores a pixel intensity value for a pixel at the pixel position (0,0) in the first image 350 shown in FIG. 7. A second pixel intensity value field 407 stores a pixel intensity value for a pixel at the pixel position (0,0) in a second image of the generally similar images stored in the locations 134 of the storage memory 106. In one embodiment, the pixel intensity value fields may store a numerical representation of the pixel intensity, which may be between 0 and 255, for example. The pixel intensity values included in the corresponding image elements record 400 may act as a set of corresponding image element values.

Referring back to FIG. 3, the codes 122 continue at block 208, which directs the processor 102 shown in FIG. 2 to identify at least one image element value from the set of corresponding image element values to be excluded from a subset of the set of corresponding image element values. For example, block 208 may direct the processor 102 to identify at least one pixel intensity value for exclusion from a subset of the pixel intensity values of the corresponding image elements record 400 shown in FIG. 8 and stored in the locations 136 of the storage memory 106. In various embodiments, block 208 may direct the processor 102 to identify extreme image element values as image element values to be excluded.

A flowchart depicting blocks of codes that may be included in the block 208 in accordance with one embodiment is shown at 500 in FIG. 9. The flowchart 500 begins with block 502 which directs the processor 102 to identify at least one lowest pixel intensity value as a value to be excluded. In one embodiment, block 502 may direct the processor to read the corresponding image elements record 400 (shown in FIG. 8) stored in the locations 136 of the storage memory 106 and to compare values of the pixel intensity value fields 404 and identify a lowest pixel intensity value as a value to be excluded. Accordingly, at block 502 the processor 102 may identify the value of a fifth pixel intensity value field 408 of the corresponding image elements record 400 shown in FIG. 8 as a value to be excluded.

Referring to FIG. 9, block 504 then directs the processor 102 shown in FIG. 2 to identify at least one highest pixel intensity value as a value to be excluded. Block 504 may direct the processor 102 to read the corresponding image elements record 400 shown in FIG. 8 and to compare values of the pixel intensity value fields 404 and identify a highest pixel intensity value as a value to be excluded. Accordingly at block 504 the processor 102 may identify the value of a third pixel intensity value field 410 of the corresponding image elements record 400 shown in FIG. 8 as a value to be excluded.

The flowchart 500 continues at block 506 which directs the processor 102 to generate an updated corresponding image elements record, which excludes the identified highest and lowest pixel values. In one embodiment, block 506 may direct the processor 102 to generate an updated corresponding image elements record 550 as shown in FIG. 10, which includes the pixel position value and pixel intensity values 552 from the corresponding image elements record 400 shown in FIG. 8 but excludes the lowest pixel intensity value (i.e., the value of the fifth pixel intensity value field 408) and the highest pixel intensity value (i.e., the value of the third pixel intensity value field 410). Referring to FIG. 9, block 506 may direct the processor 102 to store the updated corresponding image elements record 550 in the locations 138 of the storage memory 106 shown in FIG. 2.

The updated corresponding image elements record 550 stored in the locations 138 of the storage memory 106 may represent a subset of the set of corresponding image element values represented by the corresponding image elements record 400 stored in the locations 136 of the storage memory 106.

In some embodiments, blocks 502 and/or 504 may direct the processor 102 to identify more than one pixel intensity value to be excluded. In some embodiments, the number of pixel intensity values to be excluded may be determined based on the number of pixel intensity values included in the corresponding image elements record. For example, in one embodiment, blocks 502 and/or 504 may direct the processor 102 to identify a ratio or a percentage of pixel intensity values to be excluded. In one embodiment, blocks 502 and/or 504 may each direct the processor to identify about 5% to about 15% of the lowest and/or highest pixel intensity values in the corresponding image elements record to be excluded. This may result in excluding 1 or 2 out of every set of 15 pixel intensity values, for example.

In various embodiments additional or fewer pixel intensity values may be excluded. For example, in some embodiments, a user may wish to have a more sensitive detection of anomalies and so blocks 502 and 504 may direct the processor 102 exclude a larger number or percentage of pixel intensity values. In some embodiments, an increase in excluded pixel intensity values may increase the risk of false positives.

In some embodiments, a user may not wish for the detection of anomalies to be very sensitive (i.e., a user may rather miss a defect than have a false defect reported), and blocks 502 and 504 may direct the processor 102 to exclude fewer pixel intensity values, such as, for example, just one pixel intensity value or in some embodiments, zero pixel intensity values.

Referring back to FIG. 3, after block 208 is completed, block 210 directs the processor 102 shown in FIG. 2 to generate at least one criterion based on the subset of corresponding image element values. Block 210 may direct the processor 102 to identify an upper limit value and/or a lower limit value, which may act as the at least one criterion, based on the updated corresponding image elements record stored in the locations 138 of the storage memory 106.

A flowchart depicting blocks of codes for directing the processor 102 to determine an upper limit value and a lower limit value and which may be included in the block 210 in accordance with one embodiment is shown at 600 in FIG. 11. The flowchart 600 begins with block 602 which directs the processor 102 to identify the lowest pixel intensity value from the updated corresponding image elements record 550. Accordingly, referring to FIG. 10 which depicts the updated corresponding image elements record 550, the processor 102 may be directed to identify a pixel intensity value of 90 as the lowest pixel intensity value.

Referring to FIG. 11, block 604 then directs the processor 102 shown in FIG. 2 to identify the greatest pixel intensity value from the updated corresponding image elements record 550 shown in FIG. 10. Accordingly, referring to FIG. 10, the processor 102 may be directed to identify a pixel intensity value of 95 as the greatest pixel intensity value.

Referring to FIG. 11, block 606 then directs the processor 102 shown in FIG. 2 to generate a criterion record having upper and lower limits set to the identified greatest and lowest pixel intensity values. In one embodiment, block 606 may direct the processor 102 to generate a criterion record as shown at 650 in FIG. 12. The criterion record 650 includes a pixel position field 652, a lower limit field 654 and an upper limit field 656. Block 606 may direct the processor 102 to set the lower limit field 654 to the lowest pixel intensity value identified at block 602 and to set the upper limit field 656 to the greatest pixel intensity value identified at block 604. Block 606 may direct the processor 102 to store the criterion record 650 in the locations 140 of the storage memory 106.

Accordingly, the flowchart 600 may direct the processor 102 to set upper and lower limits, which may act as the at least one criterion, to the highest and lowest pixel intensities included in the updated corresponding image elements record. In some embodiments, a user may wish to detect only bright defects or only dark defects and so blocks in the flowchart 600 may be omitted and/or amended such that only one of the upper limit or the lower limit is set.

In one embodiment, blocks 206, 208, and 210 may be repeated for each pixel position (e.g. from pixel position (0,0) to pixel position (400, 1326)) in the generally similar images stored at the locations 134. Accordingly, after repeating blocks 206, 208, and 210 for each pixel position, the locations 136 of the storage memory 106 may store a plurality of corresponding image elements records having the same format as the corresponding image elements record 400 shown in FIG. 8, the locations 138 of the storage memory 106 may store a plurality of updated corresponding image elements records having the same format as the updated corresponding image elements record 550 shown in FIG. 10, and the locations 140 of the storage memory 106 may store a plurality of criterion records having the same format as the criterion record 650 shown in FIG. 12. In some embodiments, the corresponding image elements records 400 and the updated corresponding image elements records 550 may be removed from memory after the criterion records 650 have been calculated and so in some embodiments after execution of blocks 206, 208, and 210 for each pixel position, only the locations 140 may store information.

Figure 13:
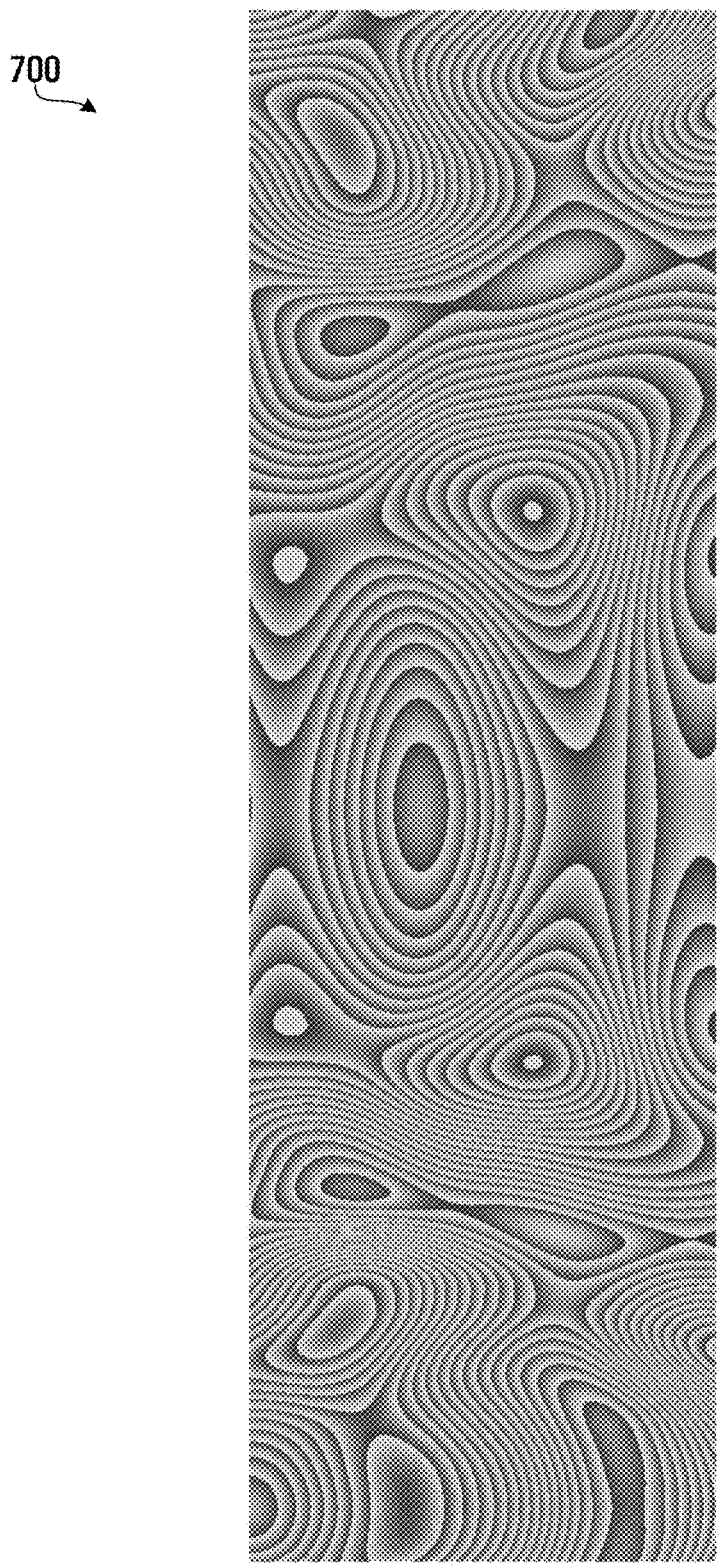
FIG. 13 is an exemplary representation of an upper limit image that may be used by the processor circuit of FIG. 2 according to one embodiment.
Figure 14:
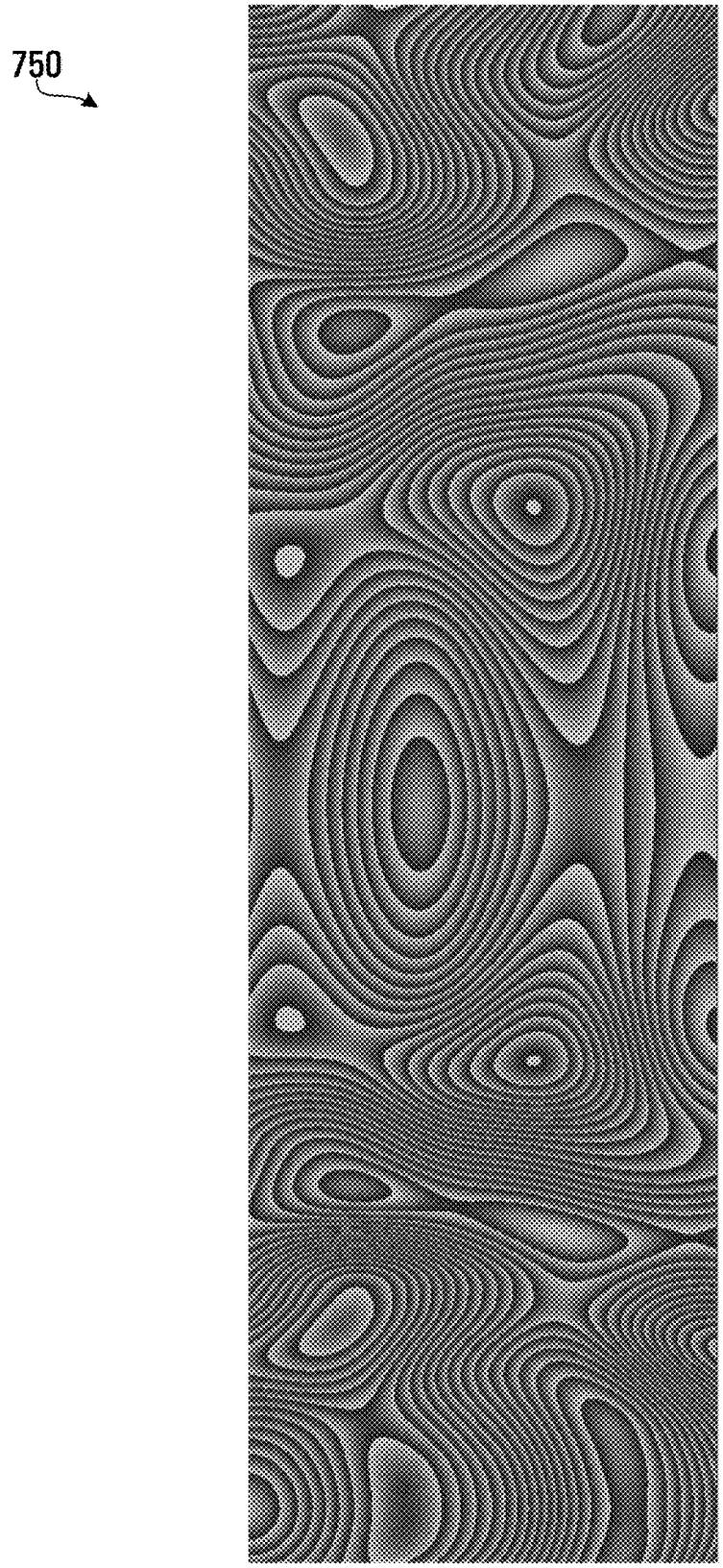
FIG. 14 is an exemplary representation of a lower limit image that may be used by the processor circuit of FIG. 2 according to one embodiment.

In some embodiments, the information included in the criterion records may be stored in the locations 140 of the storage memory 106 as an upper limit image, for example, as shown at 700 in FIG. 13 and a lower limit image, for example, as shown at 750 in FIG. 14 wherein the lower limit image 750 includes a lower limit value, as determined by block 602 for example, for each pixel position in the lower limit image 750 and the upper limit image 700 includes an upper limit value, as determined by block 604 for each pixel position in the upper limit image 700. Thus, the upper and lower limit images 700 and 750 may be stored in the locations 140 of the storage memory 106 and may represent generally the same information as stored in criterion records having the format shown in FIG. 12, but in image form. Referring to FIGS. 13 and 14, the upper limit image 700 can be seen as less darkly shaded than the lower limit image 750, since high pixel values correspond to bright spots in an image.

In various embodiments, the upper limit image 700 and the lower limit image 750 may be further processed using image processing techniques, such as, for example, standard morphological operations. In some embodiments, blocks of code included in the block 122 may direct the processor 102 to dilate the upper limit image 700 by one or more pixels in the horizontal direction, and/or by one or more pixels in the vertical direction. Likewise, in some embodiments, blocks of code included in the block 122 may direct the processor 102 to erode the lower limit image 750 by one or more pixels in the horizontal direction, and/or by one or more pixels in the vertical direction. These operations may help avoid false positives resulting from minor misalignment which may occur for example if there is drift in the process and fine-tuning (as described below, for example) is 1) not done, or 2) is not done frequently enough, and/or 3) somehow fails, for example. For example, in some embodiments, these dilation and erosion operations may help prevent a strong edge of some part of the pattern, for example a logo, being misinterpreted as a defect.

In some embodiments, because of minor drift in the direction perpendicular to the main movement along the processing line of the product 30 during processing, detected offsets in the perpendicular direction may indicate that for image elements near a camera field-of-view boundary and/or product edge, a number of pixel values (corresponding to those shown at 404 in FIG. 8) available in practice may end up being smaller than desired. Therefore, it may be advantageous to employ a strategy that causes an upper limit to drastically differ from a lower limit for pixel positions at a zone near the edges of the product 30, and/or near a camera field-of-view boundary (i.e., a very low lower limit and a very high upper limit). For example, in some embodiments, if the number of pixel values available in the corresponding image elements record is smaller than a certain minimum required number of pixel values, blocks of code included in the block 122 may direct the processor 102 to set the lower limit and the upper limit in a way that differs from the approach described having regard to blocks 208 and 210 and that may be used in non-boundary areas where a large enough number of corresponding image element values are available. For example, in some embodiments, if the number of pixel values available for a particular pixel position is smaller than a threshold number, such as, for example, about 5, then the lower limit and the upper limit may be set to 0 and 255, respectively.

Generally, because of the drift, it may be difficult to determine what the expected pattern here on the boundary area should be and therefore it may be difficult to detect any defects from the zone near the edges of the product 30. In some embodiments, a higher number of generally similar pattern images may be used to decide the criteria and, depending on the type of the drift, in some cases this may help collect more valid input data and therefore facilitate generating more accurate criteria.

Referring to FIG. 3, once blocks 206, 208 and 210 have been repeated for each pixel position, a block of code that may be included in block 210, for example, may direct the processor 102 to continue to block 212.

Block 212 directs the processor 102 shown in FIG. 2 to cause the generated criteria to be used to facilitate identification of an anomaly. Block 212 may direct the processor 102 to apply generated criteria stored in the locations 140 to an image of the product 30 that is to be analyzed for an anomaly. The image to be analyzed may be referred to herein as a subject image. In some embodiments, block 212 may direct the processor 102 to generate a new image which may emphasize anomalous elements of the subject image and block 212 may direct the processor 102 to cause the new image to be analyzed and/or displayed.

Figure 15:
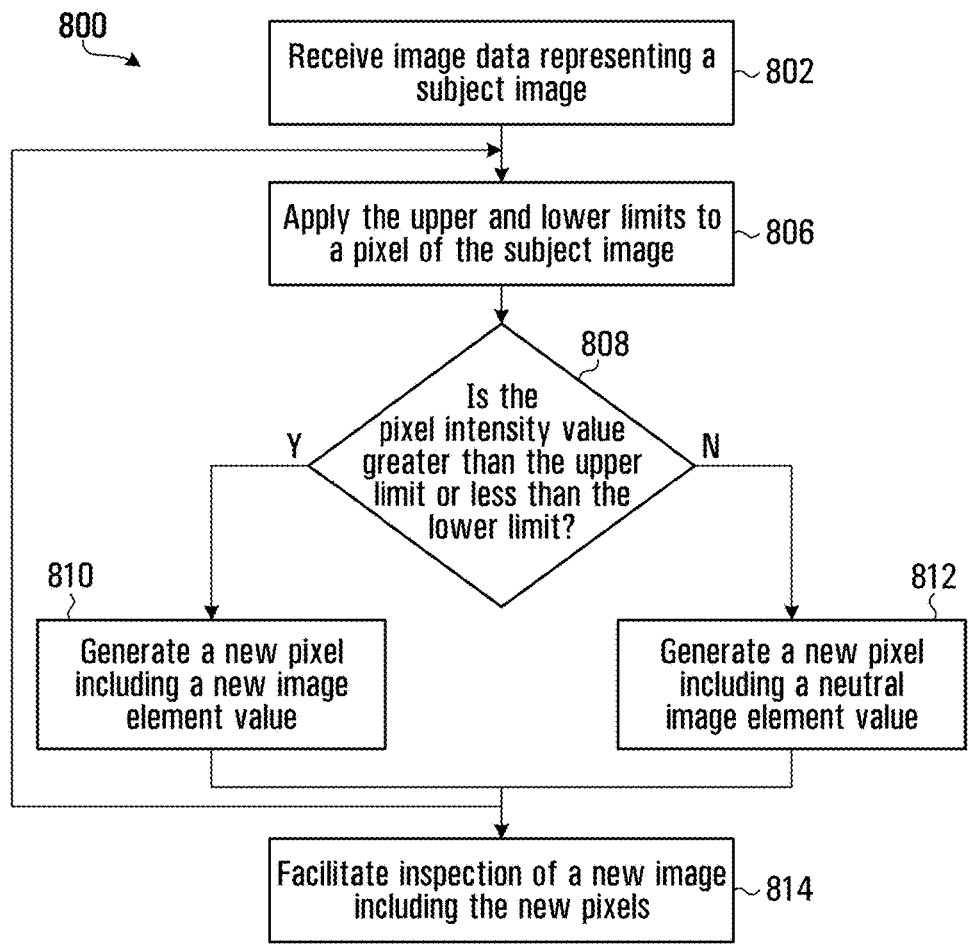
FIG. 15 is a flowchart depicting blocks of code included in the blocks of code shown in FIG. 3, according to one embodiment.

A flowchart depicting blocks of codes that may be included in the block 212 in accordance with one embodiment is shown at 800 in FIG. 15. The flowchart 800 begins with block 802 which directs the processor 102 to receive image data representing a subject image to be analyzed for an anomaly. An exemplary representation of a subject image that may be received at block 802 is shown at 850 in FIG. 16. Block 802 may direct the processor 102 to receive the image data from one or more of the cameras 12-20. In one embodiment, block 802 may direct the processor 102 to receive the image data from the first camera 12, for example. Block 802 may direct the processor 102 to store the subject image in the locations 142 of the storage memory 106 shown in FIG. 2.

Referring to FIG. 15, block 806 then directs the processor 102 shown in FIG. 2 to apply upper and lower limits to a pixel of the subject image. For example, block 806 may direct the processor 102 to retrieve pixel information for the pixel having a pixel position (0,0) in the subject image 850 and to apply upper and lower limits to the pixel.

In order to determine which upper and lower limits to apply to the pixel having position (0,0), block 806 may direct the processor 102 to determine mapping information for mapping pixel positions in the subject image 850 to pixel positions in the generally similar images stored in the locations 134.

For example, in one embodiment, the processor 102 may have received from the first camera 12 a continuous image or stream of images including the generally similar images and the subject image, and block 806 may direct the processor 102 to count the number of pixel rows before the beginning of the subject image, relative to a pattern start position and pattern length like shown at 302 and 304 in FIG. 6, to determine the mapping information. Block 806 may direct the processor 102 to determine the mapping information for subsequent subject images by counting the rows and comparing the counted rows to the pattern length stored in the pattern identifier record 300 shown in FIG. 6. In some embodiments, the mapping information may include an offset that is equal to the number of counted pixel rows from a pattern start position modulo the pattern length value.

In some embodiments, block 806 may direct the processor 102 to fine-tune the mapping information that is first determined by counting pixel rows as described above for each new subject image, using template matching. As the counted pixel rows may provide a good initial guess for the mapping information, when fine-tuning, in various embodiments block 806 may direct the processor 102 to use a search window (just a few or a few dozen pixel rows around the initial guess/expectation, for example) for template matching.

In some embodiments block 806 may direct the processor 102 to fine-tune the mapping information for every other subject image or so, for example, if limited in terms of available computing resources.

In some embodiments, block 806 may direct the processor 102 to detect that the product 30 is out of phase relative to the presently applied pattern identifier record like that shown at 300, and the counted number of pixel rows (together with the fine-tuning adjustments, if any). For example, the product 30 may be considered to be out of phase when synchronization is lost (e.g., there's a discontinuity in the pattern sequence), meaning that an expected position or mapping for the subject image is no longer valid. For example, in various embodiments, an out-of-sync situation may be detected by constantly calculating the observed correlation. A drop in a correlation score (so that the score, or a filtered score value, remains lower than a set threshold for one or more new subject images) may indicate that the synchronization has been lost. In some embodiments, when the product 30 is found to be out of phase, block 806 may direct the processor 102 to re-initialize or determine new mapping information using template matching between a representative full pattern (which may be determined by generating a median image including median pixel values from the corresponding image elements records 400 or the updated corresponding image elements records 500 stored in the storage memory 106, for example) and the subject image or multiple recent subject images. In some embodiments, the representative full pattern may be determined by generating an average image by averaging pixel values from the upper and lower limit images.

Accordingly, in some embodiments, block 806 may direct the processor 102 to determine the mapping information using template matching by first deriving a representative full pattern image from the generally similar images and then determining a portion of the representative full pattern image that most correlates to the subject image 850. The representative full pattern image may be derived as described above, for example. Template matching using a representative full pattern image may help find the correct alignment between the subject image and the detected pattern and it may be needed in case there are abrupt changes in the physical process producing the pattern and/or moving the patterned product to the place of inspection, changes in processing speed of the product 30, and/or other factors which may cause changes in the pattern and/or the observed pattern length, for example.

In some embodiments, the mapping information may be defined by an offset between pixel positions of the subject image and pixel positions of the generally similar images or criterion records, for example. Referring to FIG. 15, block 806 may direct the processor 102 shown in FIG. 2 to store the mapping information in the storage memory 106, for example. In the embodiment shown, the pixel positions of the subject image 850 are offset from the pixel positions of the generally similar images by 28 pixel positions such that pixel position (0,28) in the subject image 850 corresponds to pixel position (0,0) in the generally similar images. Since the pattern repeats, pixel position (0,0) in the subject image 850 may correspond to pixel position 1326−28=1298 in the generally similar images and/or the criterion records. The mapping information may include a representation of this 28 pixel offset in the y direction. In view of the mapping information, a pixel intensity at pixel position (0,0) in the subject image 850 may be analyzed using the criteria information stored in a criterion record 880 as shown in FIG. 17 having a pixel position field 882 value of (0,1298).

Referring back to FIG. 15, block 806 may direct the processor 102 to apply the upper and lower limits of the criterion record 880 shown in FIG. 17 having the pixel position field value of (0,1298) to the pixel intensity value of the subject image 850 which is associated with pixel position (0,0). Block 806 may direct the processor 102 to retrieve the criterion record 880 from the locations 140 of the storage memory 106 shown in FIG. 2, for example. Block 806 may direct the processor 102 to determine whether the pixel intensity value is below a lower limit field 884 value or above an upper limit field 886 value of the criterion record 880 shown in FIG. 17.

Block 808 then directs the processor 102 to proceed to block 810 or 812 depending on whether the subject image element value is greater than the upper limit or lower than the lower limit. For example, in one embodiment, the pixel of the subject image 850 acting as the subject image element value for the criterion record 880 shown in FIG. 17 may have a pixel position of (0,0) and a pixel intensity value of 90 and block 808 may direct the processor 102 to determine that the pixel intensity value is not below the lower limit field 884 value or above the upper limit field 886 value of the criterion record 880. Accordingly, block 808 may direct the processor 102 to determine that the pixel of the subject image 850 does not meet the criteria defined by the criterion record 880 and therefore block 808 directs the processor 102 to proceed to block 812.

Referring to FIG. 15, block 812 then directs the processor 102 shown in FIG. 2 to generate a new pixel or image element record including a neutral image element value. For example, the neutral image element value may be a pixel intensity value representing mid-gray and having a value of 128 and block 812 may direct the processor 102 to generate a new image element record 900 as shown in FIG. 18 having a pixel position field 902 and a pixel intensity value field 904 and to set the pixel intensity value field 904 to a pixel intensity value of 128. Block 812 may direct the processor 102 to store the new image element record 900 in the locations 144 of the storage memory 106.

Referring to FIG. 15, after block 812 is completed, the processor 102 shown in FIG. 2 may be directed to proceed back to block 806 and to repeat blocks 806 and 808, but having regard to another pixel position in the subject image 850. In various embodiments, blocks 806, 808, and 810 or 812 may be repeated for each pixel position in the subject image 850, to define a plurality of new image element records having a generally similar format to the new image element record 900 shown in FIG. 18. In some embodiments, a plurality of sets of blocks generally similar to blocks 806-812 may be executed in parallel to process different pixels. For example, in various embodiments a set of 32 pixels may be processed in parallel, with different sets of 32 pixels processed sequentially. In some embodiments, for example, 16, 32, 64, 128 or another number of pixels may be processed in parallel. In one embodiment, all of the pixels may be processed in parallel, simultaneously, if the hardware allows.

Figure 16:
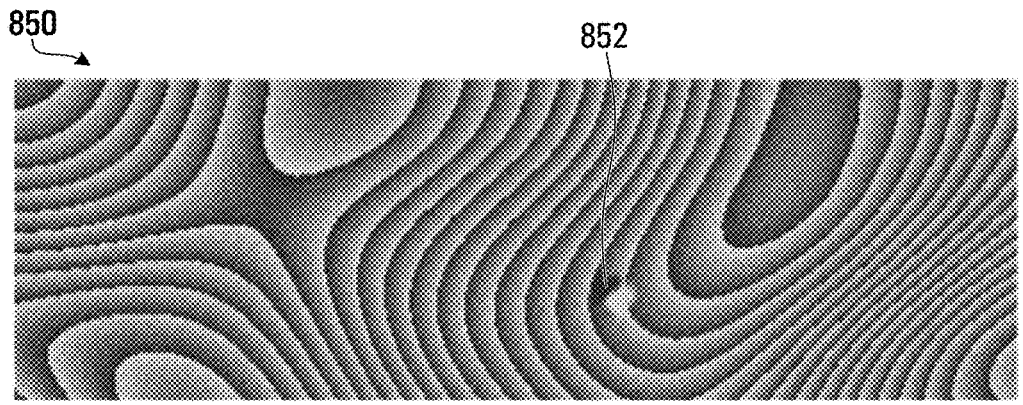
FIG. 16 is an exemplary representation of a subject image that may be received from one of the cameras included in the system of FIG. 1 according to one embodiment.

Block 806 may thus be eventually executed having regard to a pixel position (240, 80) of the subject image 850, which is shown at 852 in FIG. 16. Block 806 may thus direct the processor 102 to apply the criteria defined by a criterion record 950 shown in FIG. 19, which is mapped to or corresponds to the pixel position (240, 80) of the subject image 850, to the pixel intensity value associated with the pixel position (240, 80) of the subject image 850.

For example, the pixel intensity value associated with pixel position (240,80) of the subject image 850 shown in FIG. 16 may be 51 and block 808 may direct the processor 102 to determine that the pixel intensity value is less than the lower limit value stored in a lower limit field 952 of the criterion record 950 shown at FIG. 19. Accordingly, block 808 may direct the processor 102 to proceed to block 810 which directs the processor 102 to generate a new image element record 1000 shown in FIG. 20 and set a pixel intensity value field 1002 of the new image element record 1000 to a new image element value derived from the pixel intensity value associated with the pixel position (240,80) and the lower limit.

In some embodiments, block 810 may direct the processor 102 to set the new image element value to an extreme or non-neutral image element value. Where the pixel intensity value of the subject image is less than the lower limit value, block 810 may direct the processor 102 to generate a new image element record having a pixel intensity value set to an extreme low value. In one embodiment, block 810 may direct the processor 102 to determine the new image element value by determining the difference between the lower limit field 952 value and the pixel intensity value of the subject image and subtracting that difference from the neutral image element value. Accordingly, block 810 may direct the processor 102 to determine the new image element value to be 128−(120−51)=59.

Where the pixel intensity value of the subject image is greater than the upper limit value, block 810 may direct the processor 102 to determine a new image element value by determining the difference between an upper limit field 954 value of the criterion record 950 shown in FIG. 19 and the pixel intensity value and adding the difference to the neutral image element value. Accordingly, if the pixel intensity value of the subject image were, for example 180, block 810 may direct the processor 102 to determine the new image element value to be 128+(180−150)=158.

In some embodiments, blocks 810 and/or 812 may direct the processor 102 to scale the difference between the pixel intensity values in the subject image and the limits before adding to or subtracting from the neutral image element value. Scaling may be particularly useful when dealing with subtle defects, which can be amplified for display or analysis purposes. For example, in some embodiments, blocks 810 and/or 812 may direct the processor 102 to scale by a scaling factor of 4. Accordingly, if the pixel intensity value of the subject image were 180, the upper limit 150 and the neutral image element value 128, block 810 may direct the processor 102 to determine an extreme image element value to be 128+(180−150)*4=248. Similarly, if the pixel intensity value were 51, the lower limit 120 and the neutral image element value 128, block 810 may direct the processor 102 to determine an extreme image element value to be 128−(120−51)*4=−148. In some embodiments, if the extreme image element value is outside of a dynamic range of the pixels (e.g., negative when the dynamic range is 0-255), the extreme element value may be saturated to the maximum or minimum value within the dynamic range. Accordingly, an extreme image element value of −148 may be set to 0. Similarly, any pixel intensity values above 255 may be saturated to 255, for example.

In some embodiments, new image element values may be determined using other methods. For example, block 810 may direct the processor 102 to set the new image element value to the pixel intensity value of the subject image 850 for the particular pixel position (e.g. 51 where the pixel intensity for pixel position (240, 80) is 51).

In some embodiments, block 810 may direct the processor 102 to set the new image element value to a weighted average of the pixel intensity value of the subject image and the difference between the neutral image element value and the (possibly scaled) difference between the lower limit field value and the pixel intensity value of the subject image. If the weights were set to 0.25 and 0.75 respectively, for example, in one embodiment, block 810 may direct the processor 102 to set the new image element value for pixel position (240, 80) of the subject image 850 shown in FIG. 16 to 0.25*51+0.75*59=57. In some embodiments, a user may have previously set the weights which may be stored in the storage memory 106.

In some embodiments, the limits in the formulas may be replaced with the neutral value. In such embodiments, a new image element value may be set to equal the neutral value−scaling parameter*(neutral value−pixel intensity value of the subject image), for example. With scaling parameter=1, this option may be considered to reduce to simply using the pixel intensity value of the subject image. In some embodiments, the scaling parameter may have a value of 4. The scaling parameter may be chosen depending on how subtle or weak the anomalies or defects of interest are, when compared to the available dynamic range (e.g., integer values from 0 to 255).

In some embodiments, when using a scaling parameter, block 810 may direct the processor 102 to determine the new image element value, in part, by dividing by the difference between the upper and the lower limit. This may emphasize defects that are in areas where only very small deviations are expected. In some embodiments, the new image element value may be set, for example, to equal the neutral value−scaling parameter*(lower limit−pixel intensity value of the subject image)/(upper limit−lower limit) for pixel intensity values of the subject image that are smaller than the lower limit. Correspondingly, for pixel intensity values of the subject image that are greater than the upper limit, the new image element value may be set to equal the neutral value+scaling parameter*(pixel intensity value of the subject image−upper limit)/(upper limit−lower limit).

In some embodiments, the new image element value may be set to equal the neutral value−scaling parameter*(neutral value−pixel intensity value of the subject image)/(upper limit−lower limit), for example, for pixel intensity values of the subject image that are smaller than the lower limit (and, correspondingly, to neutral value+scaling parameter*(pixel intensity value of the subject image−neutral value)/(upper limit−lower limit) for pixel intensity values of the subject image that are greater than the upper limit).

In each case, in some embodiments, the denominator (upper limit−lower limit) may be replaced with max(upper limit−lower limit, ε), or upper limit−lower limit+ε, for example, where ε is a small constant, in order to avoid dividing by a very small number (or even zero) in areas where the generally similar images indeed are extremely similar.

In some embodiments, block 810 may direct the processor 102 to set the new image element value to a weighted average between any of the above approaches.

Referring to FIG. 15, block 810 directs the processor 102 shown in FIG. 2 to store the new image element record 1000 shown in FIG. 20 in the locations 144 of the storage memory 106.

Accordingly, since blocks 806, 808, and 810 or 812 may be executed for each of the pixel positions in the subject image 850, new image element records for each pixel position in the subject image 850 shown in FIG. 16 may be generated and stored in the locations 144 of the storage memory 106. In some embodiments, blocks 810 and 812 may direct the processor 102 to store a representation of the new image element records as a new image, for example, as shown at 1050 in FIG. 21.

In some embodiments, blocks which provide generally similar functionality to that provided by blocks 806, 808, and 810 or 812 may direct the processor 102 to generate the new image element records as follows. The following method may be useful if there is noise in the subject images, for example. The blocks may direct the processor 102 to first calculate a "bright side" value and a "dark side" value based on the upper limit, the lower limit, and the corresponding pixel intensity value of the subject image, as follows:

bright side=max(0, pixel intensity value of subject image−upper limit)
   i.e. 0 where the pixel intensity value of the subject image is less than (=darker than) the upper limit, and the difference elsewhere dark side=max(0, lower limit−pixel intensity value of subject image)
   i.e. 0 where the pixel intensity value of the subject image is greater than (=brighter than) the lower limit, and the difference elsewhere.

Then, the blocks may direct the processor 102 to interpret the collections of bright side and dark side values as two images. Then the blocks may direct the processor to further process one or both of these images, for example using a median filter. Then, the blocks may direct the processor 102 to determine which of the filtered bright side and dark side values to use for the pixel intensity value for the new image element record, as follows:

if bright side>dark side, then
new image pixel intensity=bright side
else
new image pixel intensity=−dark side This gives an image where a pixel value of 0 corresponds to no defects. In order to map the values to the usual 0-255 scale, the blocks may direct the processor 102 to multiply the new image pixel intensity with a gain constant (e.g., in one embodiment, having a value of 4) and add a mid-gray value (e.g., in one embodiment 128), so that mid-gray (128) and around correspond to no defects.

Referring to FIG. 15, after blocks 806, 808, and 810 or 812 have been completed for all of the pixel positions in the subject image 850, the processor 102 is directed to execute block 814. Block 814 directs the processor 102 to facilitate inspection of the new image element records. In various embodiments, block 814 may direct the processor 102 to facilitate inspection of the new image 1050 shown in FIG. 21, which represents the new image element records stored in the locations 144.

Figure 21:
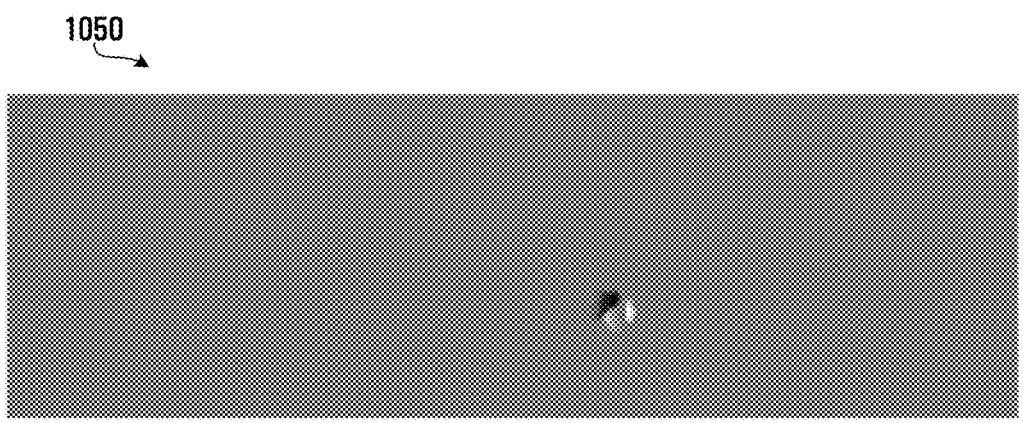
FIG. 21 is a representation of an exemplary new image that may be used by the processor circuit of FIG. 2 according to one embodiment.

In one embodiment, block 814 may direct the processor 102 to execute code included in the block of codes 124 to inspect the new image 1050 shown in FIG. 21 and to facilitate identification of one or more anomalies. The block of codes 124 may direct the processor 102 to apply web inspection methods including, for example, thresholding, and minimum size limits to generate a mask, for example, as shown at 1100 in FIG. 22, that points out the defective area. In various embodiments, the mask 1100 may show or represent, or be used to show or represent, the location and shape of identified anomalies.

Figure 22:
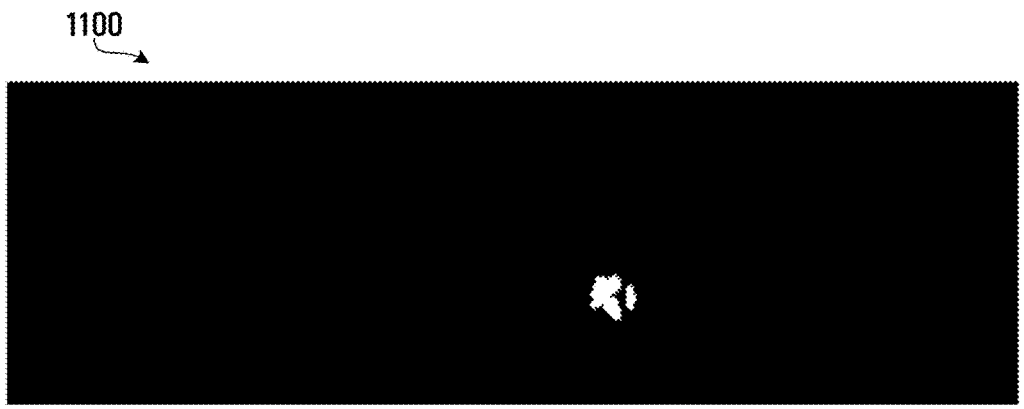
FIG. 22 is a representation of an exemplary mask that may be used by the processor circuit of FIG. 2 according to one embodiment.

Referring to FIG. 15, in some embodiments, block 814 may direct the processor 102 shown in FIG. 2 to generate the mask 1100 shown in FIG. 22 as an image having pixel intensities representing anomalous pixel locations where the new pixel intensity value is either below a low threshold or above a high threshold and pixel intensities representing non-anomalous pixel locations elsewhere. For example, in one embodiment, block 814 may direct the processor 102 to generate the mask 1100 to have pixel intensity values of 255 representing anomalous pixel locations and pixel intensity values of 0 representing non-anomalous pixel locations.

In some embodiments, a user may have previously set the upper and lower threshold values which may be stored in the storage memory 106. In some embodiments, for example, the user may use the user input devices 113 to produce signals for causing the upper and lower threshold values to be stored in the storage memory 106.

In some embodiments, the upper and lower threshold values may be set to values based on the neutral value used to generate the new image element values. For example, the upper and lower threshold values may be set to respective offsets from the neutral value. For example, in some embodiments, the upper and lower threshold values may be set to the neutral value +10 and neutral value −10 respectively.

In various embodiments, the upper and lower threshold values may not need to be symmetric around the neutral value. For example, the offset with respect to the neutral value may be different for the lower threshold and the upper threshold, if defects on the lower threshold (i.e., dark side) and upper threshold (i.e., bright side) are not equally or symmetrically interesting to the users. In some embodiments, for example, the lower and upper threshold values may be set as neutral value −10 and neutral value +20 respectively.

In some embodiments block 814 may direct the processor 102 to apply minimum size limits to groups of connected or adjacent pixels of the mask 1100 having pixel intensity values representing anomalies (i.e., in one embodiment pixel intensity values greater than 0) such that if the group of connected pixels does not meet the minimum size limits, block 814 directs the processor 102 to set these pixels of the mask to have pixel intensity values of 0.

For example, in some embodiments, block 814 may direct the processor 102 to set pixel intensity values for a group of connected non-zero intensity pixels of the mask to 0 if the total number of pixels in the group is less than a group threshold size. For example, in some embodiments, the group threshold size may be 50 pixels. In some embodiments, block 814 may direct the processor 102 to set pixel intensity values for a group of connected non-zero intensity pixels of the mask to 0 if a width of the group is less than a threshold width and/or if a height of the group is less than a threshold height. In various embodiments, the threshold width and threshold height may differ, for example, where a user is more interested in (i.e. wishes to have the detection more sensitive to) anomalies that are elongated in the one direction rather than the other. For example, in some embodiments, the threshold width may be 8 pixels and/or the threshold height may be 10 pixels.

In some embodiments, a user may have previously set the group threshold size, threshold width and/or the threshold height which may be stored in the storage memory 106. In some embodiments, for example, the user may use the user input devices 113 to produce signals for causing the group threshold size, threshold width and/or threshold height to be stored in the storage memory 106. In some embodiments, applying minimum size limits may result in filtering out noise, and/or anomalies or defects that are too small to be interesting.

In some embodiments, the lower and upper thresholds described above may act as first upper and lower threshold values and block 814 may direct the processor 102 to set pixel intensity values for a group of connected non-zero intensity pixels of the mask to 0 if the associated group of pixels in the new image 1050 shown in FIG. 21 from which the group of pixels in the mask are derived does not include at least one pixel which has a pixel intensity value lower than a second lower threshold value or greater than a second upper threshold value. For example, in some embodiments, the first lower and upper threshold values may be set to neutral value −10 and neutral value +20, respectively, and block 814 may direct the processor 102 to determine whether pixels in the new image 1050, which have the same pixel positions as pixels in groups of connected or adjacent pixels of the mask 1100 having pixel intensity values representing anomalies (i.e., non-zero pixel values in some embodiments), include at least one pixel having a pixel intensity value less than a second lower threshold value (e.g. neutral value −15) or greater than a second upper threshold value (e.g. neutral value +28). If a group of connected pixels in the new image 1050 does not have such a pixel that has a value outside of these second thresholds, then block 814 may direct the processor 102 to set the whole group of associated pixels in the mask 1100 to have pixel intensity values of 0 (or, in general, a neutral value). In practice, in some embodiments, this may make it easier to determine defect size accurately (thanks to the first thresholds which can be set to be quite sensitive) while avoiding false detections (thanks to the second thresholds that can be set to be less sensitive).

In some embodiments, the block of codes 124 shown in FIG. 2 may direct the processor 102 to generate an anomaly identifying image having a contour of the mask drawn over the subject image. For example, in some embodiments, the block of codes 124 may direct the processor 102 to generate an anomaly identifying image 1200 shown in FIG. 23 based on the subject image 850 shown in FIG. 16 and the mask 1100 shown in FIG. 22. The anomaly identifying image 1200 includes an anomaly identifier 1202 which follows the contour of the high pixel intensity values in the mask 1100.

In some embodiments, the block of codes 124 may direct the processor 102 to generate an anomaly identifying image having a contour of a dilation of the mask drawn over the subject image. For example, in some embodiments, the block of codes 124 may direct the processor 102 to generate the anomaly identifying image 1250 shown in FIG. 24 based on the subject image 850 shown in FIG. 16 and the mask 1100 shown in FIG. 22. The anomaly identifying image 1250 includes an anomaly identifier 1252 which follows the contour of a dilation of the high pixel intensity values in the mask 1100.

In some embodiments, the anomaly identifier 1202 and/or 1252 may be emphasized. For example, the anomaly identifier 1202 and/or 1252 may be shown in a color that stands out against the images. In one embodiment, the anomaly identifier 1202 and/or 1252 may be the color red.

Figure 23:
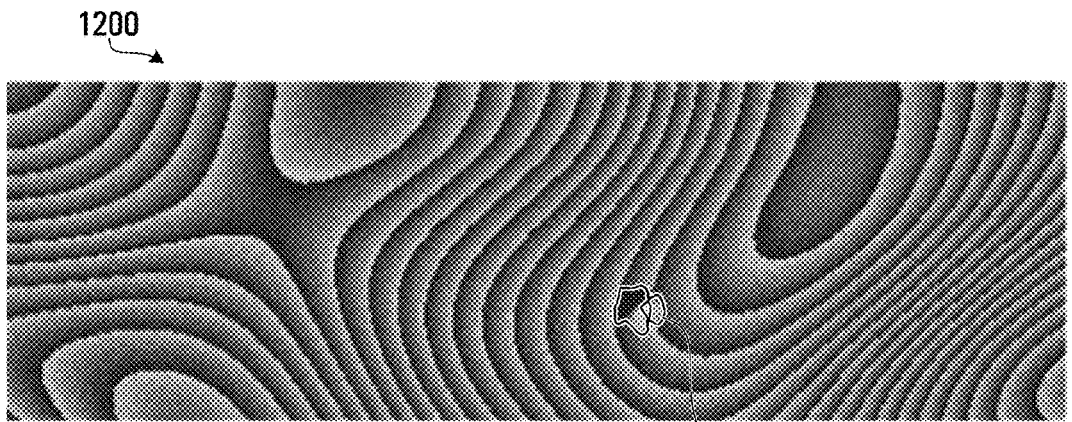
FIG. 23 is a representation of an exemplary anomaly identifying image that may be used by the processor circuit of FIG. 2 according to one embodiment.
Figure 24:
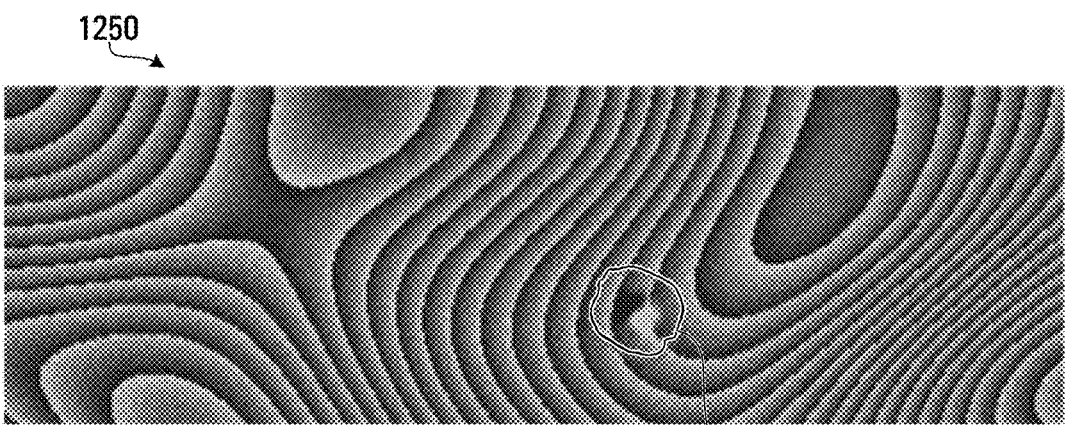
FIG. 24 is a representation of an exemplary anomaly identifying image that may be used by the processor circuit of FIG. 2 according to one embodiment.

The block of codes 124 may direct the processor 102 to store a representation of the mask 1100, the anomaly identifying image 1200 (and/or the anomaly identifier 1202), and/or the anomaly identifying image 1250 (and/or the anomaly identifier 1252) in the locations 146 of the storage memory 106, for example. The blocks of code 124 may direct the processor 102 to produce signals for causing the display 24 to display the mask 1100, the anomaly identifying image 1200 and/or the anomaly identifying image 1250 to a user. In some embodiments, the block of codes 124 may direct the processor 102 to facilitate a user being able to look at the subject image and interactively enable or disable the depiction of the anomaly identifiers or contour overlays as shown in the anomaly identifying images 1200 and/or 1250 in FIGS. 23 and 24. For example, in some embodiments, the user may interact with the user input devices 113 to produce signals for causing the anomaly identifiers as shown in FIG. 23 or 24 to be shown or hidden. In various embodiments, after viewing the anomaly identifying image 1200 and/or 1250 shown in FIGS. 23 and 24, a user may determine whether the part of the product containing the anomaly should not be shipped to a customer. In some embodiments, the user may decide that the corresponding part of the product should be rejected and possibly recycled (depending on the type of anomaly and the process). In some embodiments, the user may determine that the product could perhaps be sold as substandard quality, for a lower price. The user may cause the corresponding part of the product to be identified for rejection, recycling, or for sale at a lower price.

In some embodiments, after viewing the anomaly identifying image 1200 and/or 1250 shown in FIGS. 23 and 24, a user may determine whether, in view of the anomaly, a further step of processing (e.g., on a slitter winder where a product like a reel of paper can be split in smaller parts for eventual delivery to customers) should be performed using lower than normal speed in order to avoid significant process issues. For example, some defects in paper could cause a web break on a slitter winder if the winder runs at high speed when the defect comes to the slitting position. Therefore, in some embodiments, the user may cause a slitter winder to slow down before the defect comes to the slitting position, and then cause the slitter winder to speed up again after the defect has passed the slitting position, so that overall production speed is not compromised significantly.

In some embodiments, the detected anomaly may represent a symptom of an upstream process problem and so after viewing the anomaly identifying image 1200 and/or 1250 shown in FIGS. 23 and 24, a user may take corrective actions so that similar anomalies (defects) should not appear again in the future. The actions to be taken by the user may depend on the type of the anomaly. For example, if the anomaly includes an oil spot, somewhere in the upstream process there may be oil dripping onto the product. Therefore, the user may locate the source of the anomaly and fix the problem to help improve the quality of the end product.

In various embodiments, at least a portion of any of the above actions taken by a user in response to viewing the anomaly identifying images 1200 and/or 1250 shown in FIGS. 23 and 24, may be taken by an automation device, which may include a computer running software, for example.

In another embodiment, referring to FIG. 15, block 814 may direct the processor 102 shown in FIG. 2 to read the new image 1050 shown in FIG. 21 from the locations 144 of the storage memory 106 and to transmit signals representing the new image 1050 to an anomaly detection device or anomaly detector, via the interface 170, for example, and the anomaly detection device may be configured to inspect the new image 1050 for anomalies. In some embodiments, the anomaly detector may be configured to generate the mask 1100, the anomaly identifying image 1200, and/or the anomaly identifying image 1250 and/or produce signals for causing a display to display the mask 1100, the anomaly identifying image 1200, and/or the anomaly identifying image 1250 to a user, generally as described above.

While the above description of the flowchart 800 shown in FIG. 15 has been described above as an implementation of block 212 shown in FIG. 3 in accordance with one embodiment, in alternative embodiments, blocks of codes generally similar to the codes shown in flowchart 800 may be executed by a processor circuit to, more generally, cause criteria to be used to identify or facilitate identification of an anomaly. For example, in some embodiments the criteria may be generated and/or received using an alternative method to that described having regard to blocks 202-210 shown in FIG. 3.

Multiple Cameras

In some embodiments, the flowchart depicting the block of code 122 shown in FIG. 3 and the flowchart 800 shown in FIG. 15 may be executed for each camera of the cameras 12-20 such that each of the cameras facilitates inspection of a respective portion or lane of the product 30.

In some embodiments, block 814 may direct the processor 102 to merge the new image 1050 with other new images generated based on images received from other cameras and to facilitate inspection of the merged image, generally as described above. In some embodiments, there may be some overlap between the cameras as it may be difficult to align the cameras perfectly accurately edge to edge and from an inspection point of view an overlap may be preferable to gaps and this overlap may be handled in the merging of the images.

Determining Upper and Lower Limit Values Using Standard Deviation and Mean

Referring to FIG. 3, in some embodiments, block 210 may direct the processor 102 shown in FIG. 2 to determine the upper and lower limit values using methods other than or in addition to those described having regard to the flowchart 600 shown in FIG. 11. For example, in one embodiment, block 210 may include codes for directing the processor 102 to determine the upper and lower limits including as shown at 1150 in FIG. 25.

Figure 25:
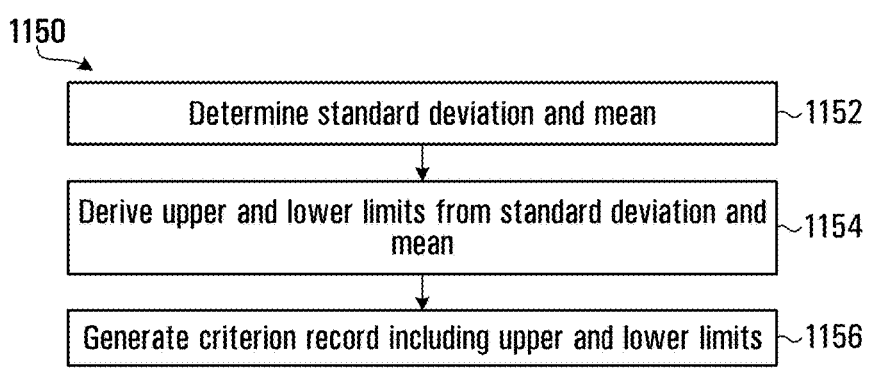
FIG. 25 is a flowchart depicting blocks of code included in the blocks of code shown in FIG. 3, according to one embodiment.

Referring to FIG. 25, the codes 1150 begin with block 1152 which directs the processor 102 shown in FIG. 2 to determine a standard deviation and a mean from the pixel intensity values 552 included in the updated corresponding image elements record 550 shown in FIG. 10. In some embodiments, block 1152 may direct the processor 102 to store the standard deviation and the mean in the storage memory 106.

Block 1154 then directs the processor 102 to derive the upper and lower limits from the standard deviation and the mean. Block 1154 may direct the processor 102 to determine the upper limit by summing or aggregating the standard deviation and the mean determined at block 1152. Block 1154 may direct the processor to determine the lower limit by subtracting the standard deviation from the mean.

In some embodiments block 1154 may direct the processor 102 to apply an upper limit factor $\alpha_{upper}$ to the standard deviation when determining the upper limit and block 1154 may direct the processor 102 to set the upper limit as follows:

upper limit=mean+$\alpha_{upper}$*standard deviation

In some embodiments block 1154 may direct the processor 102 to apply a lower limit factor $\alpha_{lower}$ to the standard deviation when determining the lower limit and block 1154 may direct the processor 102 to set the lower limit as follows:

lower limit=mean−$\alpha_{lower}$*standard deviation

In some embodiments, the upper limit factor $\alpha_{upper}$ and/or the lower limit factor $\alpha_{lower}$ may, for example, be previously provided or set by a user of the inspector 22 and stored in the storage memory 106. For example, in some embodiments, the user may use the user input devices 113 to produce signals for setting and storing the upper and/or lower limit factors in the storage memory 106.

In some embodiments, dark defects may be considered more important than bright defects and so the upper limit factor $\alpha_{upper}$ may be set to a higher value than the lower limit factor $\alpha_{lower}$. For example, in some embodiments the lower limit factor may be set to a value of 2.0 and the upper limit factor may be set to a value of 3.0. In some embodiments the upper and lower limit factors may both be set to the same value, such as, for example a value of 2.0.

Referring to FIG. 25, block 1156 then directs the processor 102 shown in FIG. 2 to generate a criterion record including upper and lower limit fields set to the derived values for the upper and lower limits. Block 1156 may direct the processor 102 to store the criterion record in the locations 140 of the storage memory 106, for example.

Accordingly, the codes 1150 which may be included in the block 210 may direct the processor 102 to set upper and lower limits, which may act as the at least one criterion, to pixel intensity values which are derived from a standard deviation and a mean generated from the pixel intensity values included in the updated corresponding image elements record.

Various Embodiments

In some embodiments particular weighted combinations of upper and lower limits described herein may be used as the upper and lower limits. For example, in some embodiments, block 210 of the block of codes 122 shown in FIG. 3 may direct the processor 102 shown in FIG. 2 to determine a lower limit as follows:

Lower limit=a*Lower limit (determined as described above based on excluded pixel values and shown at 654 in FIG. 12)+(1−a)*Lower limit based on mean and standard deviation, where a is parameter between 0 and 1 which may have been previously set by a user and stored in the storage memory 106.

The upper limit may be determined generally similarly, using the upper limit determined as described above and shown at 656 in FIG. 12 based on excluded pixel values, and an upper limit based on mean and standard deviation.

In some embodiments, the upper and/or lower limits may be determined using criteria that are explicitly prepared to handle non-normal distributions (e.g., by calculating skewness and kurtosis) for example.

In some embodiments, block 208 of the block of codes 122 shown in FIG. 3 may be omitted and the upper and lower limits may be derived as described above but from the corresponding image elements record 400 instead of the updated corresponding image elements record 550.

In some embodiments, a user may interact with the user input devices 113 to produce signals for causing the block of codes 122 to direct the processor 102 to produce signals for causing the display 24 to display representations of the upper limit image 700 shown in FIG. 13 and/or the lower limit image 750 shown in FIG. 14. For example, in some embodiments a user may wish to view the identified pattern and criteria which are to be applied to images of the product to identify anomalies and so the user may cause the block of codes 122 to direct the processor 102 to produce signals for causing the display 24 to display the representations of the upper and/or lower limit images 700 and 750.

In some embodiments, a user may notice that the upper and lower limit images 700 and 750 are not desirable and the user may wish to update the upper and lower limits. Accordingly, the user may use the user input devices 113 to cause the block of codes 122 to begin re-executing the block of codes 122 at block 202, for example, to derive new upper and lower limit records and therefore new upper and lower limit images.

In some embodiments, the block of codes 122 may include codes that direct the processor 102 to determine a score representing how well a live pattern, which may be a subject image, corresponds to the upper and lower limit images 700 and 750. For example, in some embodiments, the block of codes 122 may direct the processor 102 to count a number of pixels which are outside of the upper and lower limits provided by the upper and lower limit images and set that number as the score for the live pattern. In some embodiments, when the score meets a threshold, the block of codes 122 may direct the processor 102 to begin re-executing the block of codes 122 at block 202 shown in FIG. 3, to set new upper and lower limits.

In various embodiments, the block of codes 122 as shown in FIG. 3 may be executed continuously by the processor 102 (more or less "in the background", so that as soon as new upper and lower limits are available, they are used). This may mean that the system 10 is able to automatically adapt even to small changes in the produced pattern.

In some embodiments, the at least one criterion may include only upper limits and the block of codes 122 shown in FIG. 3 may direct the processor 102 shown in FIG. 2 to generate the upper limits and cause the upper limits to be used or applied to facilitate identification of an anomaly generally as described above but without generating and/or applying lower limits. In some embodiments, the at least one criterion may include only lower limits and the block of codes 122 may direct the processor 102 to generate the lower limits and cause the lower limits to be used or applied to facilitate identification of an anomaly generally as described above but without generating and/or applying upper limits.

While specific embodiments of the invention have been described and illustrated, such embodiments should be considered illustrative of the invention only and not as limiting the invention as construed in accordance with the accompanying claims.

What is claimed is:

1. A method for facilitating detection of at least one anomaly in a representation of a product having a pattern, the method comprising:
   causing at least one processor to receive image data representing the product during processing of the product;
   causing the at least one processor to identify from the image data generally similar images representing respective instances of a repeated aspect of the pattern, each of the images including image element values;
   causing the at least one processor to generate a set of corresponding image element values, said set including an image element value from each of the images;
   causing the at least one processor to identify at least one image element value from the set of corresponding image element values to be excluded from a subset of the set of corresponding image element values;
   causing the at least one processor to generate at least one criterion based on the subset of the set of corresponding image element values; and
   causing the at least one processor to cause the at least one criterion to be used to facilitate identification of the at least one anomaly;
   wherein causing the at least one processor to cause the at least one criterion to be used to facilitate identification of the at least one anomaly comprises:
      causing the at least one processor to receive image data representing a subject image representing at least a portion of an instance of the repeated aspect of the pattern; and
      causing the at least one processor to apply the at least one criterion to a subject image element value of the subject image, the subject image element value corresponding to the subset of corresponding image element values;
   wherein causing the at least one processor to generate the at least one criterion comprises causing the at least one processor to determine an upper limit value and a lower limit value from the subset of the set of corresponding image element values and wherein causing the at least one processor to apply the at least one criterion comprises causing the at least one processor to compare the subject image element value to the upper limit value and the lower limit value; and
   wherein causing the at least one processor to cause the at least one criterion to be used to facilitate identification of the at least one anomaly comprises:
      causing the at least one processor to determine whether the subject image element value is greater than the upper limit value or less than the lower limit value; and
      causing the at least one processor to, if the subject image element value is greater than the upper limit value or less than the lower limit value:
         generate a new image element value derived from the subject image element value and at least one of the upper limit value or the lower limit value; and
         generate a new image including the new image element value for inspection.

2. The method of claim 1 wherein causing the at least one processor to determine the upper limit value and the lower limit value comprises causing the at least one processor to set the upper limit value and the lower limit value to a greatest value and a lowest value respectively of the subset of the set of corresponding image element values.

3. The method of claim 1 wherein causing the at least one processor to determine the upper limit value and the lower limit value comprises causing the at least one processor to determine a standard deviation and a mean from the subset of the set of corresponding image element values and to derive the upper limit value and the lower limit value from the standard deviation and the mean.

4. The method of claim 1 wherein causing the at least one processor to cause the at least one criterion to be used to facilitate identification of the at least one anomaly comprises causing the at least one processor to, if the subject image element value is not greater than the upper limit value or less than the lower limit value, generate the new image to include a neutral image element value.

5. The method of claim 1 further comprising causing the at least one processor to transmit signals representing the new image to an anomaly detector.

6. The method of claim 1 further comprising causing the at least one processor to inspect the new image to determine whether the new image element value is anomalous.

7. The method of claim 1 further comprising causing the at least one processor to produce signals for causing at least one display to display a representation of the at least one anomaly to a user.

8. The method of claim 1 wherein causing the at least one processor to identify the at least one image element value to be excluded from the subset comprises causing the at least one processor to identify at least one extreme image element value as the at least one image element value to be excluded.

9. The method of claim 8 wherein the set of corresponding image element values comprise pixel values and wherein causing the at least one processor to identify the at least one extreme image element value to be excluded comprises causing the at least one processor to identify at least one lowest pixel value of the pixel values to be excluded and at least one greatest pixel value of the pixel values to be excluded.

10. The method of claim 9 wherein causing the at least one processor to identify the at least one lowest pixel value and the at least one greatest pixel value comprises causing the at least one processor to identify a first percentage of the pixel values having lowest values as the at least one lowest pixel value and to identify a second percentage of the pixel values having greatest values as the at least one greatest pixel value.

11. The method of claim 10 wherein the first and second percentages are each between 5% and 15%.

12. A system for facilitating detection of at least one anomaly in a representation of a product having a pattern, the system comprising:
  means for receiving image data representing the product during processing of the product;
  means for identifying from the image data generally similar images representing respective instances of a repeated aspect of the pattern, each of the images including image element values;
  means for generating a set of corresponding image element values, said set including an image element value from each of the images;
  means for identifying at least one image element value from the set of corresponding image element values to be excluded from a subset of the set of corresponding image element values;
  means for generating at least one criterion based on the subset of the set of corresponding image element values; and
  means for causing the at least one criterion to be used to facilitate identification of the at least one anomaly;
  wherein the means for causing the at least one criterion to be used to facilitate identification of the at least one anomaly comprises:
    means for receiving image data representing a subject image representing at least a portion of an instance of the repeated aspect of the pattern; and
    means for applying the at least one criterion to a subject image element value of the subject image, the subject image element value corresponding to the subset of corresponding image element values;
  wherein the means for generating the at least one criterion comprises means for determining an upper limit value and a lower limit value from the subset of the set of corresponding image element values and wherein the means for applying the at least one criterion comprises means for comparing the subject image element value to the upper limit value and the lower limit value; and
  wherein the means for causing the at least one criterion to be used to facilitate identification of the at least one anomaly comprises:
    means for determining whether the subject image element value is greater than the upper limit value or less than the lower limit value; and
    means for, if the subject image element value is greater than the upper limit value or less than the lower limit value:
      generating a new image element value derived from the subject image element value and at least one of the upper limit value or the lower limit value; and
      generating a new image including the new image element value for inspection.

13. An apparatus for facilitating detection of at least one anomaly in a representation of a product having a pattern, the apparatus comprising at least one processor configured to:
  receive image data representing the product during processing of the product;
  identify from the image data generally similar images representing respective instances of a repeated aspect of the pattern, each of the images including image element values;
  generate a set of corresponding image element values, said set including an image element value from each of the images;
  identify at least one image element value from the set of corresponding image element values to be excluded from a subset of the set of corresponding image element values;
  generate at least one criterion based on the subset of the set of corresponding image element values; and
  cause the at least one criterion to be used to facilitate identification of the at least one anomaly;
  wherein the at least one processor is configured to:
    receive image data representing a subject image representing at least a portion of an instance of the repeated aspect of the pattern; and
    apply the at least one criterion to a subject image element value of the subject image, the subject image element value corresponding to the subset of corresponding image element values; and
  wherein the at least one processor is configured to:
    determine an upper limit value and a lower limit value from the subset of the set of corresponding image element values; and
    compare the subject image element value to the upper limit value and the lower limit value; and
  wherein the at least one processor is configured to:
    determine whether the subject image element value is greater than the upper limit value or less than the lower limit value; and
    if the subject image element value is greater than the upper limit value or less than the lower limit value:
      generate a new image element value derived from the subject image element value and at least one of the upper limit value or the lower limit value; and
      generate a new image including the new image element value for inspection.

14. The apparatus of claim 13 wherein the at least one processor is configured to set the upper limit value and the lower limit value to a greatest value and a lowest value respectively of the subset of the set of corresponding image element values.

15. The apparatus of claim 13 wherein the at least one processor is configured to determine a standard deviation and a mean from the subset of the set of corresponding image element values and to derive the upper limit value and the lower limit value from the standard deviation and the mean.

16. The apparatus of claim 13 wherein the at least one processor is configured to, if the subject image element value is not greater than the upper limit value or less than the lower limit value, generate the new image to include a neutral image element value.

17. The apparatus of claim 13 wherein the at least one processor is configured to transmit signals representing the new image to an anomaly detector.

18. The apparatus of claim 13 wherein the at least one processor is configured to inspect the new image to determine whether the new image element value is anomalous.

19. The apparatus of claim 13 further comprising at least one display and wherein the at least one processor is configured to produce signals for causing the at least one display to display a representation of the at least one anomaly to a user.

20. The apparatus of claim 13 wherein the at least one processor is configured to identify at least one extreme image element value as the at least one image element value to be excluded.

21. The apparatus of claim 20 wherein the set of corresponding image element values comprise pixel values and wherein the at least one processor is configured to identify at least one lowest pixel value of the pixel values to be excluded and at least one greatest pixel value of the pixel values to be excluded.

22. The apparatus of claim 21 wherein the at least one processor is configured to identify a first percentage of the pixel values having lowest values as the at least one lowest pixel value and to identify a second percentage of the pixel values having greatest values as the at least one greatest pixel value.

23. The apparatus of claim 22 wherein the first and second percentages are each between 5% and 15%.

24. A non-transitory computer readable medium having stored thereon codes which, when executed by at least one processor, cause the at least one processor to:
receive image data representing the product during processing of the product;
identify from the image data generally similar images representing respective instances of a repeated aspect of the pattern, each of the images including image element values;
generate a set of corresponding image element values, said set including an image element value from each of the images;
identify at least one image element value from the set of corresponding image element values to be excluded from a subset of the set of corresponding image element values;
generate at least one criterion based on the subset of the set of corresponding image element values; and
cause the at least one criterion to be used to facilitate identification of the at least one anomaly;
wherein the codes, when executed by the at least one processor, cause the at least one processor to:
receive image data representing a subject image representing at least a portion of an instance of the repeated aspect of the pattern; and
apply the at least one criterion to a subject image element value of the subject image, the subject image element value corresponding to the subset of corresponding image element values;
wherein the codes, when executed by the at least one processor, cause the at least one processor to:
determine an upper limit value and a lower limit value from the subset of the set of corresponding image element values; and
compare the subject image element value to the upper limit value and the lower limit value; and
wherein the codes, when executed by the at least one processor, cause the at least one processor to:
determine whether the subject image element value is greater than the upper limit value or less than the lower limit value; and
if the subject image element value is greater than the upper limit value or less than the lower limit value:
generate a new image element value derived from the subject image element value and at least one of the upper limit value or the lower limit value; and
generate a new image including the new image element value for inspection.

25. The non-transitory computer readable medium of claim 24 wherein the codes, when executed by the at least one processor, cause the at least one processor to set the upper limit value and the lower limit value to a greatest value and a lowest value respectively of the subset of the set of corresponding image element values.

26. The non-transitory computer readable medium of claim 24 wherein the codes, when executed by the at least one processor, cause the at least one processor to determine a standard deviation and a mean from the subset of the set of corresponding image element values and to derive the upper limit value and the lower limit value from the standard deviation and the mean.

27. The non-transitory computer readable medium of claim 24 wherein the codes, when executed by the at least one processor, cause the at least one processor to, if the subject image element value is not greater than the upper limit value or less than the lower limit value, generate the new image to include a neutral image element value.

28. The non-transitory computer readable medium of claim 24 wherein the codes, when executed by the at least one processor, cause the at least one processor to transmit signals representing the new image to an anomaly detector.

29. The non-transitory computer readable medium of claim 24 wherein the codes, when executed by the at least one processor, cause the at least one processor to inspect the new image to determine whether the new image element value is anomalous.

30. The non-transitory computer readable medium of claim 24 wherein the codes, when executed by the at least one processor, cause the at least one processor to produce signals for causing at least one display to display a representation of the at least one anomaly to a user.

31. The non-transitory computer readable medium of claim 24 wherein the codes, when executed by the at least one processor, cause the at least one processor to identify at least one extreme image element value as the at least one image element value to be excluded.

32. The non-transitory computer readable medium of claim 31 wherein the codes, when executed by the at least one processor, cause the at least one processor to identify at least one lowest pixel value of the pixel values to be excluded and at least one greatest pixel value of the pixel values to be excluded.

33. The non-transitory computer readable medium of claim 32 wherein the codes, when executed by the at least one processor, cause the at least one processor to identify a first percentage of the pixel values having lowest values as the at least one lowest pixel value and to identify a second percentage of the pixel values having greatest values as the at least one greatest pixel value.

34. The non-transitory computer readable medium of claim 33 wherein the first and second percentages are each between 5% and 15%.

* * * * *